US010511499B2

(12) United States Patent
Mukerji et al.

(10) Patent No.: US 10,511,499 B2
(45) Date of Patent: *Dec. 17, 2019

(54) REAL-TIME CONFIGURATION DISCOVERY AND MANAGEMENT

(71) Applicant: ExtraHop Networks, Inc., Seattle, WA (US)

(72) Inventors: Arindum Mukerji, Seattle, WA (US); Jeffery Bradford Fry, Bothell, WA (US)

(73) Assignee: ExtraHop Networks, Inc., Seattle, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/384,697

(22) Filed: Apr. 15, 2019

(65) Prior Publication Data
US 2019/0245759 A1 Aug. 8, 2019

Related U.S. Application Data

(63) Continuation of application No. 15/675,216, filed on Aug. 11, 2017, now Pat. No. 10,263,863.

(51) Int. Cl.
G06F 15/173 (2006.01)
H04L 12/26 (2006.01)
(Continued)

(52) U.S. Cl.
CPC .......... H04L 43/04 (2013.01); H04L 41/0813 (2013.01); H04L 41/0893 (2013.01);
(Continued)

(58) Field of Classification Search
USPC ....................................................... 709/224
See application file for complete search history.

(56) References Cited

U.S. PATENT DOCUMENTS 5,430,727 A 7/1995 Callon
5,541,995 A 7/1996 Normile et al.
(Continued)

FOREIGN PATENT DOCUMENTS

EP 1026867 A2 8/2000

OTHER PUBLICATIONS

Official Communication for U.S. Appl. No. 13/831,673 dated Sep. 30, 2013, 10 pages.
(Continued)

Primary Examiner — Hee Soo Kim
(74) Attorney, Agent, or Firm — John W. Branch; Lowe Graham Jones PLLC

(57) ABSTRACT

Embodiments are directed to monitoring network traffic in a network. A network monitoring engine may monitor networks to collect characteristics associated with network flows. The network monitoring engine may be arranged to identify entities on the network based on characteristics associated with the network flows. The network monitoring engine may provide entity profiles based on the identified entities and the characteristics. A configuration management engine may compare the entity profiles with configuration item (CI) entries in a database. The configuration management engine may provide discrepancy notices based on differences discovered during the comparison. Accordingly, the network monitoring engine may execute one or more policies to perform one or more additional actions based on the one or more discrepancies notices. Also, the configuration management engine may perform audits of an organization's information technology infrastructure to identify one or more violations of compliance policies.

20 Claims, 9 Drawing Sheets

(51) Int. Cl.
*H04L 12/24* (2006.01)
*H04L 29/06* (2006.01)
*H04L 29/08* (2006.01)

(52) U.S. Cl.
CPC ............ *H04L 41/12* (2013.01); *H04L 43/026* (2013.01); *H04L 43/08* (2013.01); *H04L 63/102* (2013.01); *H04L 63/1408* (2013.01); *H04L 67/16* (2013.01); *H04L 41/0853* (2013.01); *H04L 41/0869* (2013.01); *H04L 41/0873* (2013.01); *H04L 43/06* (2013.01)

(56) References Cited

U.S. PATENT DOCUMENTS

| | | | |
|---|---|---|---|
| 5,802,599 | A | 9/1998 | Cabrera et al. |
| 5,835,726 | A | 11/1998 | Shwed et al. |
| 6,141,686 | A | 10/2000 | Jackowski et al. |
| 6,765,909 | B1 | 7/2004 | Sen et al. |
| 6,807,156 | B1 | 10/2004 | Veres et al. |
| 7,089,326 | B2 | 8/2006 | Boucher et al. |
| 7,193,968 | B1 | 3/2007 | Kapoor et al. |
| 7,313,141 | B2 | 12/2007 | Kan et al. |
| 7,480,292 | B2 | 1/2009 | Busi et al. |
| 7,545,499 | B2 | 6/2009 | Overbeck et al. |
| 7,602,731 | B2 | 10/2009 | Jain |
| 7,864,764 | B1 | 1/2011 | Ma et al. |
| 7,937,755 | B1* | 5/2011 | Guruswamy ....... H04L 63/1416 709/223 |
| 7,979,555 | B2 | 7/2011 | Rothstein et al. |
| 8,079,083 | B1 | 12/2011 | Bennett et al. |
| 8,125,908 | B2 | 2/2012 | Rothstein et al. |
| 8,185,953 | B2 | 5/2012 | Rothstein et al. |
| 8,411,677 | B1 | 4/2013 | Colloff |
| 8,619,579 | B1 | 12/2013 | Rothstein et al. |
| 2002/0024964 | A1 | 2/2002 | Baum et al. |
| 2002/0080720 | A1 | 6/2002 | Pegrum et al. |
| 2002/0091844 | A1 | 7/2002 | Craft et al. |
| 2003/0152094 | A1 | 8/2003 | Colavito et al. |
| 2003/0204621 | A1 | 10/2003 | Poletto et al. |
| 2003/0214913 | A1 | 11/2003 | Kan et al. |
| 2004/0003094 | A1 | 1/2004 | See |
| 2004/0047325 | A1 | 3/2004 | Hameleers et al. |
| 2004/0088557 | A1 | 5/2004 | Malcolm et al. |
| 2004/0093513 | A1 | 5/2004 | Cantrell et al. |
| 2004/0250059 | A1 | 12/2004 | Ramelson et al. |
| 2005/0015622 | A1* | 1/2005 | Williams ............ H04L 41/0853 726/4 |
| 2005/0060427 | A1 | 3/2005 | Phillips et al. |
| 2005/0091357 | A1 | 4/2005 | Krantz et al. |
| 2005/0100000 | A1 | 5/2005 | Faulkner et al. |
| 2005/0182833 | A1 | 8/2005 | Duffie et al. |
| 2005/0210242 | A1 | 9/2005 | Troxel et al. |
| 2006/0029096 | A1 | 2/2006 | Babbar et al. |
| 2006/0045017 | A1 | 3/2006 | Yamasaki |
| 2006/0123477 | A1 | 6/2006 | Raghavan et al. |
| 2007/0088845 | A1 | 4/2007 | Memon et al. |
| 2007/0156919 | A1 | 7/2007 | Potti et al. |
| 2007/0192863 | A1 | 8/2007 | Kapoor et al. |
| 2008/0062995 | A1 | 3/2008 | Kaas |
| 2008/0069002 | A1 | 3/2008 | Savoor et al. |
| 2008/0130659 | A1 | 6/2008 | Polland |
| 2008/0141275 | A1 | 6/2008 | Borgendale et al. |
| 2008/0222717 | A1 | 9/2008 | Rothstein et al. |
| 2008/0282080 | A1* | 11/2008 | Hyndman ........... H04L 41/5003 713/150 |
| 2009/0225675 | A1 | 9/2009 | Baum et al. |
| 2009/0245083 | A1 | 10/2009 | Hamzeh |
| 2009/0296593 | A1 | 12/2009 | Prescott |
| 2010/0091770 | A1 | 4/2010 | Ishikawa |
| 2010/0095367 | A1 | 4/2010 | Narayanaswamy |
| 2010/0250928 | A1 | 9/2010 | Goto |
| 2010/0316216 | A1 | 12/2010 | Fukushima et al. |
| 2010/0322248 | A1 | 12/2010 | Ivanov |
| 2011/0019574 | A1 | 1/2011 | Malomsoky et al. |
| 2011/0073490 | A1 | 3/2011 | Hayamizu et al. |
| 2011/0280149 | A1 | 11/2011 | Okada et al. |
| 2012/0176917 | A1 | 7/2012 | Matityahu et al. |
| 2012/0215328 | A1 | 8/2012 | Schmelzer |
| 2012/0243533 | A1 | 9/2012 | Leong |
| 2012/0290711 | A1* | 11/2012 | Upham ................ H04L 43/022 709/224 |
| 2012/0294305 | A1 | 11/2012 | Rose et al. |
| 2013/0010608 | A1 | 1/2013 | Ramachandran et al. |
| 2013/0042323 | A1 | 2/2013 | Narayanaswamy et al. |
| 2013/0061036 | A1 | 3/2013 | Oliver |
| 2013/0064084 | A1 | 3/2013 | Babbar et al. |
| 2013/0103734 | A1 | 4/2013 | Boldyrev et al. |
| 2013/0166730 | A1 | 6/2013 | Wilkinson |
| 2013/0232104 | A1 | 9/2013 | Goyal et al. |
| 2014/0040451 | A1 | 2/2014 | Agrawal et al. |
| 2014/0068035 | A1* | 3/2014 | Croy .................. H04L 41/0893 709/221 |
| 2014/0142972 | A1 | 5/2014 | Hosenfeld, Jr. |
| 2016/0036647 | A1* | 2/2016 | Gonzalez ............. H04L 41/147 370/241 |

OTHER PUBLICATIONS

Official Communication for U.S. Appl. No. 13/831,673 dated Mar. 6, 2014, 12 pages.
Official Communication for U.S. Appl. No. 13/831,673 dated May 22, 2014, 5 pages.
Official Communication for U.S. Appl. No. 14/518,996 dated Nov. 20, 2014, 41 pages.
Official Communication for U.S. Appl. No. 13/831,908 dated Jun. 25, 2014, 15 pages.
Official Communication for U.S. Appl. No. 14/500,893 dated Nov. 20, 2014, 15 pages.
Official Communication for U.S. Appl. No. 13/831,908 dated Apr. 9, 2014, 3 pages.
Official Communication for U.S. Appl. No. 13/831,908 dated Aug. 9, 2013, 29 pages.
Official Communication for U.S. Appl. No. 13/831,908 dated Jan. 13, 2014, 31 pages.
Official Communication for U.S. Appl. No. 13/831,959 dated Aug. 22, 2013, 9 pages.
Handel et al. "Hiding Data in the OSI Network Model," Los Alamos, New Mexico, 1996, 16 pages.
Official Communication for U.S. Appl. No. 14/107,631 dated Feb. 20, 2014, 16 pages.
Official Communication for U.S. Appl. No. 14/107,631 dated Sep. 26, 2014, 14 pages.
Handley et al., "Network Intrusion Detection: Evasion, Traffic Normalization, and End-to-End Protocol Semantics," 2011, International Computer Science Institute, 17 pages.
Information Sciences Institute, "Internet Protocol Darpa Internet Program Protocol Specification," Sep. 1981, 36 pages.
Fuertes, "Evaluation of OSPF Extensions in MANET Routing," Paris, 2007, 192 pages.
Parsons, "Moving Across the Internet: Code-Bodies, Code-Corpses, and Network Architecture," May 9, 2010, 20 pages.
Zander et al., "Covert Channels and Countermeasures in Computer Network Protocols," Dec. 2007, 7 pages.
Official Communication for U.S. Appl. No. 14/500,893 dated Feb. 18, 2015, 11 pages.
Official Communication for U.S. Appl. No. 14/107,631 dated Dec. 30, 2014, 12 pages.
Official Communication for U.S. Appl. No. 13/831,626 dated Sep. 3, 2013, 17 pages.
Official Communication for U.S. Appl. No. 14/107,580 dated Mar. 17, 2015, 5 pages.
Official Communication for U.S. Appl. No. 14/107,580 dated Sep. 15, 2014, 16 pages.
Official Communication for U.S. Appl. No. 14/107,580 dated Mar. 6, 2014, 13 pages.
European Communication and Search Report for European Application No. 17210996.9, dated Jun. 13, 2018, 7 pages.

(56) References Cited

OTHER PUBLICATIONS

Official Communication for U.S. Appl. No. 14/107,580 dated Nov. 20, 2017, pp. 1-21.
Official Communication for U.S. Appl. No. 14/107,580 dated Mar. 22, 2018, pp. 1-12.
Official Communication for U.S. Appl. No. 14/107,580 dated Aug. 28, 2018, pp. 1-25.
Official Communication for U.S. Appl. No. 14/107,580 dated Jan. 29, 2019, pp. 1-18.

* cited by examiner

| CI Entry | |
|---|---|
| Name | server1 |
| Description | HR webserver |
| Class | Server |
| Service | Web Server |
| Department | HR |
| Make | ABC |
| Model | 1234 |
| Serial Number | A3456 |
| ... | ... |
| Location | Bldg 1, 6th floor |
| MAC Address | 393...333 |
| OS | Linux |
| Kernel | 2.6.18 |
| Memory | 16BG |
| Applications | [...] |
| Policy | [...] |
| Relationships | [...] |

REAL-TIME CONFIGURATION DISCOVERY AND MANAGEMENT

CROSS-REFERENCE TO RELATED APPLICATION(S)

This Utility patent application is a Continuation of U.S. patent application Ser. No. 15/675,216 filed on Aug. 11, 2017, now U.S. Pat. No. 10,263,863 issued on Apr. 16, 2019, the benefit of which is claimed under 35 U.S.C. § 120, and the contents of which is further incorporated in entirety by reference.

TECHNICAL FIELD

The present invention relates generally to network monitoring, and more particularly, but not exclusively, to monitoring networks in a distributed network monitoring environment.

BACKGROUND

On most computer networks, bits of data arranged in bytes are packaged into collections of bytes called packets. These packets are generally communicated between computing devices over networks in a wired and/or wireless manner. A suite of communication protocols is typically employed to communicate between at least two endpoints over one or more networks. The protocols are typically layered on top of one another to form a protocol stack. One model for a network communication protocol stack is the Open Systems Interconnection (OSI) model, which defines seven layers of different protocols that cooperatively enable communication over a network. The OSI model layers are arranged in the following order: Physical (1), Data Link (2), Network (3), Transport (4), Session (5), Presentation (6), and Application (7).

Another model for a network communication protocol stack is the Internet Protocol (IP) model, which is also known as the Transmission Control Protocol/Internet Protocol (TCP/IP) model. The TCP/IP model is similar to the OSI model except that it defines four layers instead of seven. The TCP/IP model's four layers for network communication protocol are arranged in the following order: Link (1), Internet (2), Transport (3), and Application (4). To reduce the number of layers from four to seven, the TCP/IP model collapses the OSI model's Application, Presentation, and Session layers into its Application layer. Also, the OSI's Physical layer is either assumed or is collapsed into the TCP/IP model's Link layer. Although some communication protocols may be listed at different numbered or named layers of the TCP/IP model versus the OSI model, both of these models describe stacks that include basically the same protocols. For example, the TCP protocol is listed on the fourth layer of the OSI model and on the third layer of the TCP/IP model. To assess and troubleshoot communicated packets and protocols over a network, different types of network monitors can be employed. One type of network monitor, a "packet sniffer" may be employed to generally monitor and record packets of data as they are communicated over a network. Some packet sniffers can display data included in each packet and provide statistics regarding a monitored stream of packets. Also, some types of network monitors are referred to as "protocol analyzers" in part because they can provide additional analysis of monitored and recorded packets regarding a type of network, communication protocol, or application.

Generally, packet sniffers and protocol analyzers passively monitor network traffic without participating in the communication protocols. In some instances, they receive a copy of each packet on a particular network segment or VLAN from one or more members of the network segment. They may receive these packet copies through a port mirror on a managed Ethernet switch, e.g., a Switched Port Analyzer (SPAN) port, a Roving Analysis Port (RAP), or the like, or combinations thereof. Port mirroring enables analysis and debugging of network communications. Port mirroring can be performed for inbound or outbound traffic (or both) on single or multiple interfaces. In other instances, packet copies may be provided to the network monitors from a specialized network tap or from a software agent running on the client or server. In virtual environments, port mirroring may be performed on a virtual switch that is incorporated within the hypervisor.

In some instances, a proxy is actively arranged between two endpoints, such as a client device and a server device. The proxy intercepts each packet sent by each endpoint and optionally transforms and forwards the payload to the other endpoint. Proxies often enable a variety of additional services such as load balancing, caching, content filtering, and access control. In some instances, the proxy may operate as a network monitor. In other instances, the proxy may forward a copy of the packets to a separate network monitor.

Increasingly, configuration management databases CMDBs may be employed to document and manage information associated with an organization's information technology. In some cases, CMDBs or other databases may be arranged to store information related to an organization's IT assets (e.g., hardware or software) as well as the relationships between managed IT assets. However, given the dynamic nature of contemporary IT infrastructure, it may be difficult to keep the information CMDBs accurate or up to date. The current state of the art requires manual methods or intrusive systems to perform updates. These can be error prone and difficult to maintain. Thus, it is with respect to these considerations and others that the present invention has been made.

BRIEF DESCRIPTION OF THE DRAWINGS

Non-limiting and non-exhaustive embodiments of the present innovations are described with reference to the following drawings. In the drawings, like reference numerals refer to like parts throughout the various figures unless otherwise specified. For a better understanding of the described innovations, reference will be made to the following Detailed Description of Various Embodiments, which is to be read in association with the accompanying drawings, wherein.

DETAILED DESCRIPTION OF VARIOUS EMBODIMENTS

Figure 1:
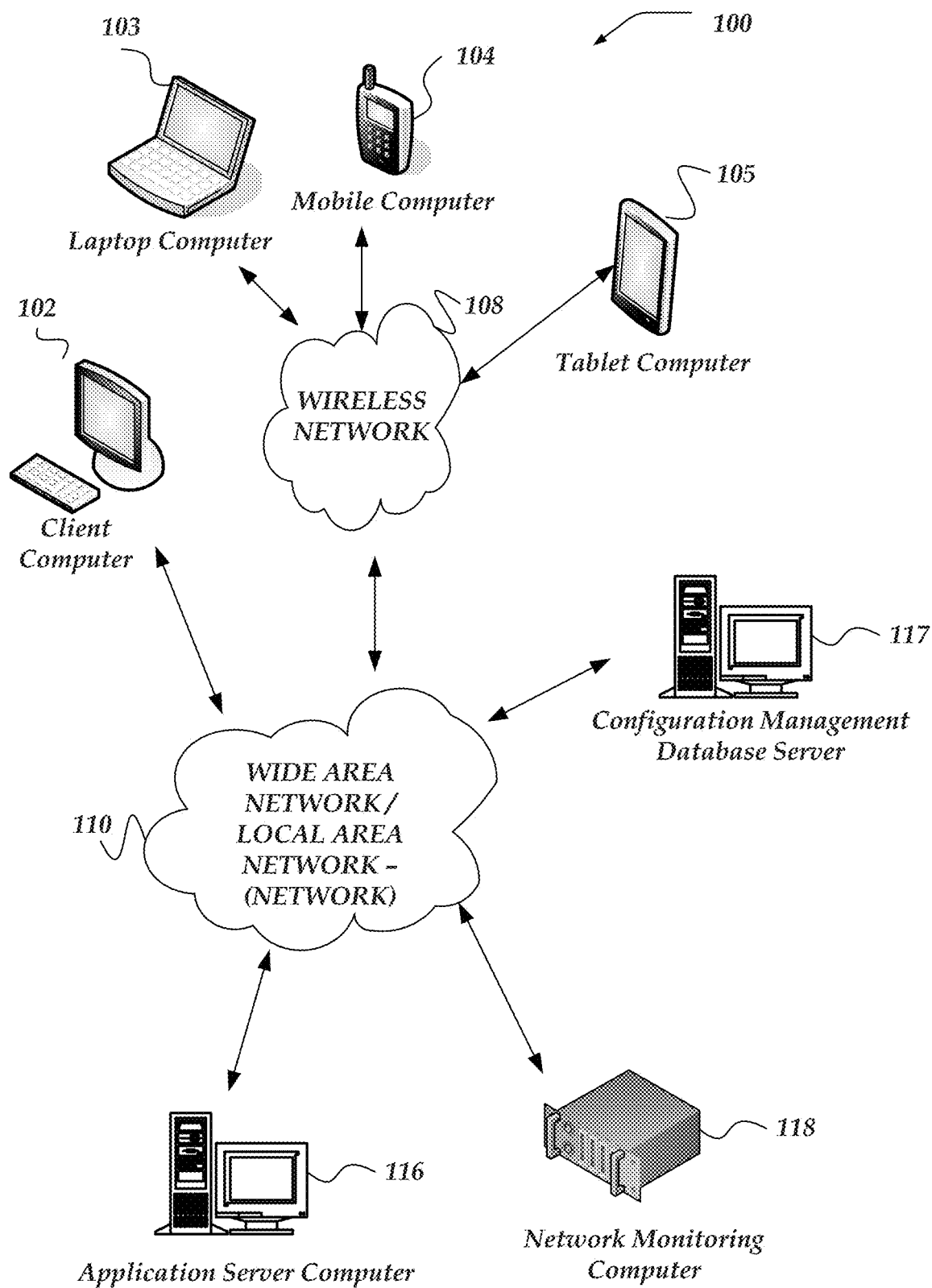
FIG. 1 illustrates a system environment in which various embodiments may be implemented.

Various embodiments now will be described more fully hereinafter with reference to the accompanying drawings, which form a part hereof, and which show, by way of illustration, specific exemplary embodiments by which the invention may be practiced. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments may be methods, systems, media or devices. Accordingly, the various embodiments may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

For example embodiments, the following terms are also used herein according to the corresponding meaning, unless the context clearly dictates otherwise.

As used herein the term, "engine" refers to logic embodied in hardware or software instructions, which can be written in a programming language, such as C, C++, Objective-C, COBOL, Java™, PHP, Perl, JavaScript, Ruby, VBScript, Microsoft .NET™ languages such as C#, and/or the like. An engine may be compiled into executable programs or written in interpreted programming languages. Software engines may be callable from other engines or from themselves. Engines described herein refer to one or more logical modules that can be merged with other engines or applications, or can be divided into sub-engines. The engines can be stored in non-transitory computer-readable medium or computer storage device and be stored on and executed by one or more general purpose computers, thus creating a special purpose computer configured to provide the engine.

As used herein, the term "session" refers to a semi-permanent interactive packet interchange between two or more communicating endpoints, such as network devices. A session is set up or established at a certain point in time, and torn down at a later point in time. An established communication session may involve more than one message in each direction. A session may have stateful communication where at least one of the communicating network devices saves information about the session history to be able to communicate. A session may also provide stateless communication, where the communication consists of independent requests with responses between the endpoints. An established session is the basic requirement to perform a connection-oriented communication. A session also is the basic step to transmit in connectionless communication modes.

As used herein, the terms "network connection," and "connection" refer to communication sessions with a semi-permanent connection for interactive packet interchange between two or more communicating endpoints, such as network devices. The connection may be established before application data is transferred, and where a stream of data is delivered in the same or different order than it was sent. The alternative to connection-oriented transmission is connectionless communication. For example, the datagram mode of communication used by the Internet Protocol (IP) and the Universal Datagram Protocol (UDP) may deliver packets out of order, since different packets may be routed independently and could be delivered over different paths. Packets associated with a TCP protocol connection may also be routed independently and could be delivered over different paths. However, for TCP connections the network communication system may provide the packets to application endpoints in the correct order.

Connection-oriented communication may be a packet-mode virtual circuit connection. For example, a transport layer virtual circuit protocol such as the TCP protocol can deliver packets of data in order although the lower layer switching is connectionless. A connection-oriented transport layer protocol such as TCP can also provide connection-oriented communications over connectionless communication. For example, if TCP is based on a connectionless network layer protocol (such as IP), this TCP/IP protocol can then achieve in-order delivery of a byte stream of data, by means of segment sequence numbering on the sender side, packet buffering and data packet reordering on the receiver side. Alternatively, the virtual circuit connection may be established in a datalink layer or network layer switching mode, where all data packets belonging to the same traffic stream are delivered over the same path, and traffic flows are identified by some connection identifier rather than by complete routing information, which enables fast hardware based switching.

As used herein, the terms "session flow" and "network flow" refer to one or more network packets or a stream of network packets that are communicated in a session that is established between at least two endpoints, such as two network devices. In one or more of the various embodiments, flows may be useful if one or more of the endpoints of a session may be behind a network traffic management device, such as a firewall, switch, router, load balancer, or the like. In one or more of the various embodiments, such flows may be used to ensure that the packets sent between the endpoints of a flow may be routed appropriately.

Typically, establishing a TCP based connection between endpoints begins with the execution of an initialization protocol and creates a single bi-directional flow between two endpoints, e.g., one direction of flow going from endpoint A to endpoint B, the other direction of the flow going from endpoint B to endpoint A, where each endpoint is at least identified by an IP address and a TCP port.

Also, some protocols or network applications may establish a separate flow for control information that enables management of at least one or more flows between two or more endpoints. Further, in some embodiments, network flows may be half-flows that may be unidirectional.

As used herein, the term "tuple" refers to a set of values that identify a source and destination of a network packet, which may, under some circumstances, be a part of a network connection. In one embodiment, a tuple may include a source Internet Protocol (IP) address, a destination IP address, a source port number, a destination port number, virtual LAN segment identifier (VLAN ID), tunnel identifier, routing interface identifier, physical interface identifier, or a protocol identifier. Tuples may be used to identify network flows (e.g., connection flows).

As used herein the term "related flows," or "related network flows" as used herein are network flows that while separate they are operating cooperatively. For example, some protocols, such as, FTP, SIP, RTP, VOIP, custom protocols, or the like, may provide control communication over one network flow and data communication over other network flows. Further, configuration rules may define one or more criteria that are used to recognize that two or more network flows should be considered related flows. For example, configuration rules may define that flows containing a particular field value should be grouped with other flows having the same field value, such as, a cookie value, or the like.

As used herein, the terms "network monitor", "network monitoring computer", or "NMC" refer to an application (software, hardware, or some combination) that is arranged to monitor and record flows of packets in a session that are communicated between at least two endpoints over at least one network. The NMC can provide information for assessing different aspects of these monitored flows. In one or more embodiment, the NMC may passively monitor network packet traffic without participating in the communication protocols. This monitoring may be performed for a variety of reasons, including troubleshooting and proactive remediation, end-user experience monitoring, SLA monitoring, capacity planning, application lifecycle management, infrastructure change management, infrastructure optimization, business intelligence, security, and regulatory compliance. The NMC can receive network communication for monitoring through a variety of means including network taps, wireless receivers, port mirrors or directed tunnels from network switches, clients or servers including the endpoints themselves, or other infrastructure devices. In at least some of the various embodiments, the NMC may receive a copy of each packet on a particular network segment or virtual local area network (VLAN). Also, for at least some of the various embodiments, they may receive these packet copies through a port mirror on a managed Ethernet switch, e.g., a Switched Port Analyzer (SPAN) port, a Roving Analysis Port (RAP), or the like, or combination thereof. Port mirroring enables analysis and debugging of network communications. Port mirroring can be performed for inbound or outbound traffic (or both) on single or multiple interfaces.

The NMC may track network connections from and to end points such as a client and/or a server. The NMC may also extract information from the packets including protocol information at various layers of the communication protocol stack. The NMC may reassemble or reconstruct the stream of data exchanged between the endpoints. The NMC may perform decryption of the payload at various layers of the protocol stack. The NMC may passively monitor the network traffic or it may participate in the protocols as a proxy. The NMC may attempt to classify the network traffic according to communication protocols that are used.

The NMC may also perform one or more actions for classifying protocols that may be a necessary precondition for application classification. While some protocols run on well-known ports, others do not. Thus, even if there is traffic on a well-known port, it is not necessarily the protocol generally understood to be assigned to that port. As a result, the NMC may perform protocol classification using one or more techniques, such as, signature matching, statistical analysis, traffic analysis, and other heuristics. In some cases, the NMC may use adaptive protocol classification techniques where information used to classify the protocols may be accumulated and/or applied over time to further classify the observed protocols. In some embodiments, NMCs may be arranged to employ stateful analysis. Accordingly, for each supported protocols, an NMC may use network packet payload data to drive a state machine that mimics the protocol state changes in the client/server flows being monitored. The NMC may categorize the traffic where categories might include file transfers, streaming audio, streaming video, database access, interactive, gaming, and the like. The NMC may attempt to determine whether the traffic corresponds to known communications protocols, such as HTTP, FTP, SMTP, RTP, TDS, TCP, IP, and the like.

In one or more of the various embodiments, NMCs and/or NMC functionality may be implemented using hardware or software based proxy devices that may be arranged to intercept network traffic in the monitored networks.

As used herein, the terms "layer" and "model layer" refer to a layer of one or more communication protocols in a stack of communication protocol layers that are defined by a model, such as the OSI model and the TCP/IP (IP) model. The OSI model defines seven layers and the TCP/IP model defines four layers of communication protocols.

For example, at the OSI model's lowest or first layer (Physical), streams of electrical/light/radio impulses (bits) are communicated between computing devices over some type of media, such as cables, network interface cards, radio wave transmitters, and the like. At the next or second layer (Data Link), bits are encoded into packets and packets are also decoded into bits. The Data Link layer also has two sub-layers, the Media Access Control (MAC) sub-layer and the Logical Link Control (LLC) sub-layer. The MAC sub-layer controls how a computing device gains access to the data and permission to transmit it. The LLC sub-layer controls frame synchronization, flow control and error checking. At the third layer (Network), logical paths are created, known as virtual circuits, to communicated data from node to node. Routing, forwarding, addressing, internetworking, error handling, congestion control, and packet sequencing are functions of the Network layer. At the fourth layer (Transport), transparent transfer of data between end computing devices, or hosts, is provided. The Transport layer is responsible for end to end recovery and flow control to ensure complete data transfer over the network.

At the fifth layer (Session) of the OSI model, connections between applications are established, managed, and terminated. The Session layer sets up, coordinates, and terminates conversations, exchanges, and dialogues between applications at each end of a connection. At the sixth layer (Presentation), independence from differences in data representation, e.g., encryption, is provided by translating from application to network format and vice versa. Generally, the Presentation layer transforms data into the form that the protocols at the Application layer (7) can accept. For example, the Presentation layer generally handles the formatting and encrypting/decrypting of data that is communicated across a network.

At the top or seventh layer (Application) of the OSI model, application and end user processes are supported. For example, communication partners may be identified, quality of service can be identified, user authentication and privacy may be considered, and constraints on data syntax can be identified. Generally, the Application layer provides services for file transfer, messaging, and displaying data. Protocols at the Application layer include FTP, HTTP, and Telnet.

To reduce the number of layers from four to seven, the TCP/IP model collapses the OSI model's Application, Presentation, and Session layers into its Application layer. Also, the OSI's Physical layer is either assumed or may be collapsed into the TCP/IP model's Link layer. Although some communication protocols may be listed at different numbered or named layers of the TCP/IP model versus the OSI model, both of these models describe stacks that include basically the same protocols.

As used herein, the "device profile" refers to a data structure that represents the characteristics of network devices that are discovered in networks monitored by NMCs. Values or fields in device profiles may be based on metrics, network traffic characteristics, network footprints, or the like, that have been collected based on passive network monitoring of network traffic in one or more monitored networks. Device profiles may be provided for various network devices, such as, client computers, server computers, application server computers, networked storage devices, routers, switches, firewalls, virtual machines, cloud instances, or the like.

As used herein, the "application profile" refers to a data structure that represents the characteristics of applications or services that are discovered in networks monitored by NMCs. Values or fields in application profiles may be based on metrics, network traffic characteristics, network footprints, or the like, that have been collected based on passive network monitoring of network traffic in one or more monitored networks. Application profiles may be provided for various applications, such as, client computers, server computers, application server computers, networked storage devices, routers, switches, firewalls, virtual machines, cloud instances, or the like. For example, application profiles may be provided for web clients, web servers, database clients, database servers, credentialing services, mobile application clients, payment processors, groupware clients, groupware services, micro-services, container based services, document management clients, document management services, billing/invoicing systems, building management services, healthcare management services, VOIP clients, VOIP servers, or the like.

As used herein, the term "entity profile" refers to a data structure that represent the characteristics of a network entity that may be a combination of device profiles and application profiles. Entity profiles may also include additional values or fields based on metrics, network traffic characteristics, network footprint, or the like, that have been collected based on passive network monitoring of network traffic in one or more monitored networks. For example, an entity profile may be provided for application servers where the entity profile is made from some or all of the device profile of the computer running or hosting the applications and some or all of the application profiles associated with the applications or services that are running or hosting one the computer. In some cases, multiple services or applications running on devices may be included in the same entity profile. In other cases, entity profiles may be arranged in hierarchal data structure similar to an object oriented computer languages class hierarchy.

As used herein, the terms "configuration management database," or "CMDB" refer to a database, data store, or repository that hold information related to information technology (IT) assets in an organization's IT infrastructure. CMDB typically are arranged to store configuration item (CI) entries that correspond to IT assets in an organization. Also, in some cases, CMDBs may also store descriptions or definitions of the allowed or anticipated relationships between IT assets. CMDBs are intended to enable an organization to better understand their IT infrastructure. Accordingly, in some cases, CMDBs are relied on to provide a definitive descriptive records of an organizations IT infrastructure. In some cases, CMDBs are special purpose database services. In other cases, CMDBs may be implemented using general purpose database services.

As used herein, the terms "configuration item entry," or "CI entry" refer to configuration items that are stored in a CMDB.

As used herein, the term "discrepancy notice" refers to one or more messages, notifications, events, alarms, log entries, or the like, or combination thereof, that correspond to discrepancies discovered if comparing CI entries to entity profiles.

The following briefly describes embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, various embodiments are directed to monitoring network traffic in a network. In one or more of the various embodiments, a network monitoring engine may be employed to perform actions including monitoring one or more networks to collect a plurality of characteristics associated with one or more network flows. In one or more of the various embodiments, monitoring the network may include passively monitoring network traffic on the network, such that the network monitoring engine is separate from the one or more identified entities.

In one or more of the various embodiments, the network monitoring engine may be arranged to identify one or more entities on the one or more network based on one or more of the plurality of characteristics that may be associated with the one or more network flows. In one or more of the various embodiments, identifying the one or more entities, may include employing one or more metrics collected by the network monitoring engine to identify the one or more entities, such that the one or more collected metrics include number of connections, traffic rate, traffic direction information, duration of connections, security credentials, secure cipher suites used, types of protocols, or errors.

In one or more of the various embodiments, identifying the one or more entities, may include identifying one or more network devices or one or more network applications based on a network footprint, such that the network footprint may be comprised of one or more metrics collected without having to perform deep inspection of network packets in the one or more network flows. Also, in one or more of the various embodiments, identifying the one or more entities, may include: identifying one or more network devices on the network based on associated network traffic; and identifying one or more applications on the network based on network traffic associated with the one or more applications.

In one or more of the various embodiments, the network monitoring engine may provide one or more entity profiles based on the identified entities and the one or more characteristics. In one or more of the various embodiments, providing the one or more entity profiles may include: providing one or more device profiles that may correspond to one or more network devices that may be identified based on the monitoring of the network; providing one or more application profiles that may correspond to one or more applications that may be identified based on the monitoring of the network; and providing the one or more entity profiles based on associating the one or more device profiles with the one or more application profiles.

Next, in one or more of the various embodiments, a configuration management engine may be employed to compare the one or more entity profiles with one or more configuration item (CI) entries in a database. In one or more of the various embodiments, comparing the one or more entity profiles with the one or more CI item entries, may include: identifying each CI entry in the database that may be unassociated with the one or more entity profiles; and identifying each entity profile that may be unassociated with the one or more CI entries.

In one or more of the various embodiments, the configuration management engine may be arranged to provide one or more discrepancy notices based on differences in the comparison, such that each discrepancy notice may be associated with one or more differences between the one or more entity profiles or corresponding CI entries.

Accordingly, in one or more of the various embodiments, the network monitoring engine may be employed to execute one or more policies to perform one or more additional actions based on the one or more discrepancies notices.

In one or more of the various embodiments, employing the configuration management engine to perform additional actions including: performing one or more audits of an organization's information technology infrastructure, such that the one or more audits include one or more of software license audits, device license audits, inventory audits, security audits, or entities relationship audits; and employing the one or more audits to identify one or more violations of compliance policies.

Illustrated Operating Environment

FIG. 1 shows components of one embodiment of an environment in which embodiments of the invention may be practiced. Not all of the components may be required to practice the invention, and variations in the arrangement and type of the components may be made without departing from the spirit or scope of the invention. As shown, system 100 of FIG. 1 includes local area networks (LANs)/wide area networks (WANs)—(network) 110, wireless network 108, client computers 102-105, application server computer 116, configuration management database 117, network monitoring computer 118, or the like.

At least one embodiment of client computers 102-105 is described in more detail below in conjunction with FIG. 2. In one embodiment, at least some of client computers 102-105 may operate over one or more wired and/or wireless networks, such as networks 108, and/or 110. Generally, client computers 102-105 may include virtually any computer capable of communicating over a network to send and receive information, perform various online activities, offline actions, or the like. In one embodiment, one or more of client computers 102-105 may be configured to operate within a business or other entity to perform a variety of services for the business or other entity. For example, client computers 102-105 may be configured to operate as a web server, firewall, client application, media player, mobile telephone, game console, desktop computer, or the like. However, client computers 102-105 are not constrained to these services and may also be employed, for example, as for end-user computing in other embodiments. It should be recognized that more or less client computers (as shown in FIG. 1) may be included within a system such as described herein, and embodiments are therefore not constrained by the number or type of client computers employed.

Computers that may operate as client computer 102 may include computers that typically connect using a wired or wireless communications medium such as personal computers, multiprocessor systems, microprocessor-based or programmable electronic devices, network PCs, or the like. In some embodiments, client computers 102-105 may include virtually any portable computer capable of connecting to another computer and receiving information such as, laptop computer 103, mobile computer 104, tablet computers 105, or the like. However, portable computers are not so limited and may also include other portable computers such as cellular telephones, display pagers, radio frequency (RF) devices, infrared (IR) devices, Personal Digital Assistants (PDAs), handheld computers, wearable computers, integrated devices combining one or more of the preceding computers, or the like. As such, client computers 102-105 typically range widely in terms of capabilities and features. Moreover, client computers 102-105 may access various computing applications, including a browser, or other web-based application.

A web-enabled client computer may include a browser application that is configured to send requests and receive responses over the web. The browser application may be configured to receive and display graphics, text, multimedia, and the like, employing virtually any web-based language. In one embodiment, the browser application is enabled to employ JavaScript, HyperText Markup Language (HTML), eXtensible Markup Language (XML), JavaScript Object Notation (JSON), Cascading Style Sheets (CS S), or the like, or combination thereof, to display and send a message. In one embodiment, a user of the client computer may employ the browser application to perform various activities over a network (online). However, another application may also be used to perform various online activities.

Client computers 102-105 also may include at least one other client application that is configured to receive and/or send content between another computer. The client application may include a capability to send and/or receive content, or the like. The client application may further provide information that identifies itself, including a type, capability, name, and the like. In one embodiment, client computers 102-105 may uniquely identify themselves through any of a variety of mechanisms, including an Internet Protocol (IP)

address, a phone number, Mobile Identification Number (MIN), an electronic serial number (ESN), a client certificate, or other device identifier. Such information may be provided in one or more network packets, or the like, sent between other client computers, application server computer 116, configuration management database server computer 117, network monitoring computer 118, or other computers.

Client computers 102-105 may further be configured to include a client application that enables an end-user to log into an end-user account that may be managed by another computer, such as application server computer 116, configuration management database server computer 117, network monitoring computer 118, or the like. Such an end-user account, in one non-limiting example, may be configured to enable the end-user to manage one or more online activities, including in one non-limiting example, project management, software development, system administration, configuration management, search activities, social networking activities, browse various websites, communicate with other users, or the like. Further, client computers may be arranged to enable users to provide configuration information, or the like, to network monitoring computer 118. Also, client computers may be arranged to enable users to display reports, interactive user-interfaces, and/or results provided by network monitor computer 118.

Wireless network 108 is configured to couple client computers 103-105 and its components with network 110. Wireless network 108 may include any of a variety of wireless sub-networks that may further overlay stand-alone ad-hoc networks, and the like, to provide an infrastructure-oriented connection for client computers 103-105. Such sub-networks may include mesh networks, Wireless LAN (WLAN) networks, cellular networks, and the like. In one embodiment, the system may include more than one wireless network.

Wireless network 108 may further include an autonomous system of terminals, gateways, routers, and the like connected by wireless radio links, and the like. These connectors may be configured to move freely and randomly and organize themselves arbitrarily, such that the topology of wireless network 108 may change rapidly.

Wireless network 108 may further employ a plurality of access technologies including 2nd (2G), 3rd (3G), 4th (4G) 5th (5G) generation radio access for cellular systems, WLAN, Wireless Router (WR) mesh, and the like. Access technologies such as 2G, 3G, 4G, 5G, and future access networks may enable wide area coverage for mobile computers, such as client computers 103-105 with various degrees of mobility. In one non-limiting example, wireless network 108 may enable a radio connection through a radio network access such as Global System for Mobil communication (GSM), General Packet Radio Services (GPRS), Enhanced Data GSM Environment (EDGE), code division multiple access (CDMA), time division multiple access (TDMA), Wideband Code Division Multiple Access (WCDMA), High Speed Downlink Packet Access (HSDPA), Long Term Evolution (LTE), and the like. In essence, wireless network 108 may include virtually any wireless communication mechanism by which information may travel between client computers 103-105 and another computer, network, a cloud-based network, a cloud instance, or the like.

Network 110 is configured to couple network computers with other computers, including, application server computer 116, configuration management database server computer 117, network monitoring computer 118, client computers 102-105 through wireless network 108, or the like.

Network 110 is enabled to employ any form of computer readable media for communicating information from one electronic device to another. Also, network 110 can include the Internet in addition to local area networks (LANs), wide area networks (WANs), direct connections, such as through a universal serial bus (USB) port, Ethernet port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, and/or other carrier mechanisms including, for example, E-carriers, Integrated Services Digital Networks (ISDNs), Digital Subscriber Lines (DSLs), wireless links including satellite links, or other communications links known to those skilled in the art. Moreover, communication links may further employ any of a variety of digital signaling technologies, including without limit, for example, DS-0, DS-1, DS-2, DS-3, DS-4, OC-3, OC-12, OC-48, or the like. Furthermore, remote computers and other related electronic devices could be remotely connected to either LANs or WANs via a modem and temporary telephone link. In one embodiment, network 110 may be configured to transport information of an Internet Protocol (IP).

Additionally, communication media typically embodies computer readable instructions, data structures, program modules, or other transport mechanism and includes any information non-transitory delivery media or transitory delivery media. By way of example, communication media includes wired media such as twisted pair, coaxial cable, fiber optics, wave guides, and other wired media and wireless media such as acoustic, RF, infrared, and other wireless media.

One embodiment of application server computer 116 or configuration management database server computer 117 is described in more detail below in conjunction with FIG. 3. One embodiment of network monitoring computer 118 is described in more detail below in conjunction with FIG. 3. Although FIG. 1 illustrates application server computer 116, application server computer 117, and network monitor device 118, each as a single computer, the innovations and/or embodiments are not so limited. For example, one or more functions of application server computer 116, configuration management database server computer 117, and/or network monitoring computer 118, or the like, may be distributed across one or more distinct network computers. Moreover, in one or more embodiment, network monitoring computer 118 may be implemented using a plurality of network computers. Further, in one or more of the various embodiments, application server computer 116, configuration management database server computer 117, or network monitoring computer 118 may be implemented using one or more cloud instances in one or more cloud networks. Accordingly, these innovations and embodiments are not to be construed as being limited to a single environment, and other configurations, and other architectures are also envisaged.

Illustrative Client Computer

Figure 2:
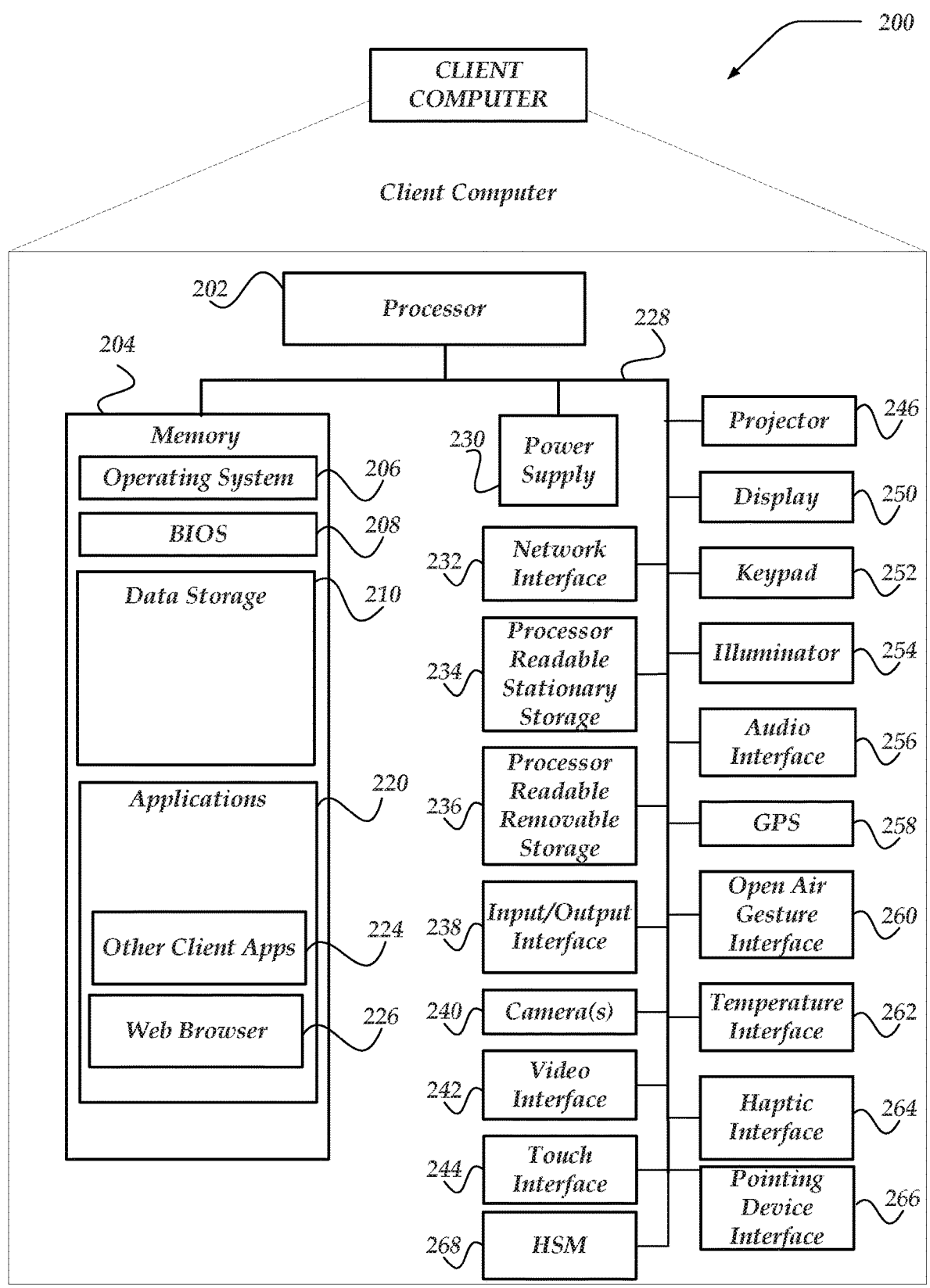
FIG. 2 illustrates a schematic embodiment of a client computer.

FIG. 2 shows one embodiment of client computer 200 that may include many more or less components than those shown. Client computer 200 may represent, for example, at least one embodiment of mobile computers or client computers shown in FIG. 1.

Client computer 200 may include processor 202 in communication with memory 204 via bus 228. Client computer 200 may also include power supply 230, network interface 232, audio interface 256, display 250, keypad 252, illuminator 254, video interface 242, input/output interface 238, haptic interface 264, global positioning systems (GPS) receiver 258, open air gesture interface 260, temperature interface 262, camera(s) 240, projector 246, pointing device interface 266, processor-readable stationary storage device 234, and processor-readable removable storage device 236. Client computer 200 may optionally communicate with a base station (not shown), or directly with another computer. And in one embodiment, although not shown, a gyroscope may be employed within client computer 200 to measuring and/or maintaining an orientation of client computer 200.

Power supply 230 may provide power to client computer 200. A rechargeable or non-rechargeable battery may be used to provide power. The power may also be provided by an external power source, such as an AC adapter or a powered docking cradle that supplements and/or recharges the battery.

Network interface 232 includes circuitry for coupling client computer 200 to one or more networks, and is constructed for use with one or more communication protocols and technologies including, but not limited to, protocols and technologies that implement any portion of the OSI model for mobile communication (GSM), CDMA, time division multiple access (TDMA), UDP, TCP/IP, SMS, MMS, GPRS, WAP, UWB, WiMax, SIP/RTP, GPRS, EDGE, WCDMA, LTE, UMTS, OFDM, CDMA2000, EV-DO, HSDPA, or any of a variety of other wireless communication protocols. Network interface 232 is sometimes known as a transceiver, transceiving device, or network interface card (MC).

Audio interface 256 may be arranged to produce and receive audio signals such as the sound of a human voice. For example, audio interface 256 may be coupled to a speaker and microphone (not shown) to enable telecommunication with others and/or generate an audio acknowledgement for some action. A microphone in audio interface 256 can also be used for input to or control of client computer 200, e.g., using voice recognition, detecting touch based on sound, and the like.

Display 250 may be a liquid crystal display (LCD), gas plasma, electronic ink, light emitting diode (LED), Organic LED (OLED) or any other type of light reflective or light transmissive display that can be used with a computer. Display 250 may also include a touch interface 244 arranged to receive input from an object such as a stylus or a digit from a human hand, and may use resistive, capacitive, surface acoustic wave (SAW), infrared, radar, or other technologies to sense touch and/or gestures.

Projector 246 may be a remote handheld projector or an integrated projector that is capable of projecting an image on a remote wall or any other reflective object such as a remote screen.

Video interface 242 may be arranged to capture video images, such as a still photo, a video segment, an infrared video, or the like. For example, video interface 242 may be coupled to a digital video camera, a web-camera, or the like. Video interface 242 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 252 may comprise any input device arranged to receive input from a user. For example, keypad 252 may include a push button numeric dial, or a keyboard. Keypad 252 may also include command buttons that are associated with selecting and sending images.

Illuminator 254 may provide a status indication and/or provide light. Illuminator 254 may remain active for specific periods of time or in response to event messages. For example, when illuminator 254 is active, it may backlight the buttons on keypad 252 and stay on while the client computer is powered. Also, illuminator 254 may backlight these buttons in various patterns when particular actions are performed, such as dialing another client computer. Illuminator 254 may also cause light sources positioned within a transparent or translucent case of the client computer to illuminate in response to actions.

Further, client computer 200 may also comprise hardware security module (HSM) 268 for providing additional tamper resistant safeguards for generating, storing and/or using security/cryptographic information such as, keys, digital certificates, passwords, passphrases, two-factor authentication information, or the like. In some embodiments, hardware security module may be employed to support one or more standard public key infrastructures (PKI), and may be employed to generate, manage, and/or store keys pairs, or the like. In some embodiments, HSM 268 may be a stand-alone computer, in other cases, HSM 268 may be arranged as a hardware card that may be added to a client computer.

Client computer 200 may also comprise input/output interface 238 for communicating with external peripheral devices or other computers such as other client computers and network computers. The peripheral devices may include an audio headset, virtual reality headsets, display screen glasses, remote speaker system, remote speaker and microphone system, and the like. Input/output interface 238 can utilize one or more technologies, such as Universal Serial Bus (USB), Infrared, WiFi, WiMax, Bluetooth™, and the like.

Input/output interface 238 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect and/or measure data that is external to client computer 200. Haptic interface 264 may be arranged to provide tactile feedback to a user of the client computer. For example, the haptic interface 264 may be employed to vibrate client computer 200 in a particular way when another user of a computer is calling. Temperature interface 262 may be used to provide a temperature measurement input and/or a temperature changing output to a user of client computer 200. Open air gesture interface 260 may sense physical gestures of a user of client computer 200, for example, by using single or stereo video cameras, radar, a gyroscopic sensor inside a computer held or worn by the user, or the like. Camera 240 may be used to track physical eye movements of a user of client computer 200.

GPS transceiver 258 can determine the physical coordinates of client computer 200 on the surface of the Earth, which typically outputs a location as latitude and longitude values. GPS transceiver 258 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of client computer 200 on the surface of the Earth. It is understood that under different conditions, GPS transceiver 258 can determine a physical location for client computer 200. In one or more embodiment, however, client computer 200 may, through other components, provide other information that may be employed to determine a physical location of the client computer, including for example, a Media Access Control (MAC) address, IP address, and the like.

Human interface components can be peripheral devices that are physically separate from client computer 200, allowing for remote input and/or output to client computer 200. For example, information routed as described here through human interface components such as display 250 or keyboard 252 can instead be routed through network interface 232 to appropriate human interface components located remotely. Examples of human interface peripheral components that may be remote include, but are not limited to, audio devices, pointing devices, keypads, displays, cameras, projectors, and the like. These peripheral components may communicate over a Pico Network such as Bluetooth™, Zigbee™ and the like. One non-limiting example of a client computer with such peripheral human interface components is a wearable computer, which might include a remote pico projector along with one or more cameras that remotely communicate with a separately located client computer to sense a user's gestures toward portions of an image projected by the pico projector onto a reflected surface such as a wall or the user's hand.

A client computer may include web browser application 226 that is configured to receive and to send web pages, web-based messages, graphics, text, multimedia, and the like. The client computer's browser application may employ virtually any programming language, including a wireless application protocol messages (WAP), and the like. In one or more embodiment, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), HTML5, and the like.

Memory 204 may include RAM, ROM, and/or other types of memory. Memory 204 illustrates an example of computer-readable storage media (devices) for storage of information such as computer-readable instructions, data structures, program modules or other data. Memory 204 may store BIOS 208 for controlling low-level operation of client computer 200. The memory may also store operating system 206 for controlling the operation of client computer 200. It will be appreciated that this component may include a general-purpose operating system such as a version of UNIX, or LINUX™, or a specialized client computer communication operating system such as Windows Phone™, or the Symbian® operating system. The operating system may include, or interface with a Java virtual machine module that enables control of hardware components and/or operating system operations via Java application programs.

Memory 204 may further include one or more data storage 210, which can be utilized by client computer 200 to store, among other things, applications 220 and/or other data. For example, data storage 210 may also be employed to store information that describes various capabilities of client computer 200. The information may then be provided to another device or computer based on any of a variety of methods, including being sent as part of a header during a communication, sent upon request, or the like. Data storage 210 may also be employed to store social networking information including address books, buddy lists, aliases, user profile information, or the like. Data storage 210 may further include program code, data, algorithms, and the like, for use by a processor, such as processor 202 to execute and perform actions. In one embodiment, at least some of data storage 210 might also be stored on another component of client computer 200, including, but not limited to, non-transitory processor-readable removable storage device 236, processor-readable stationary storage device 234, or even external to the client computer.

Applications 220 may include computer executable instructions which, when executed by client computer 200, transmit, receive, and/or otherwise process instructions and data. Applications 220 may include, for example, other client applications 224, web browser 226, or the like. Client computers may be arranged to exchange communications, such as, queries, searches, messages, notification messages, event messages, alerts, performance metrics, log data, API calls, or the like, combination thereof, with application servers and/or network monitoring computers.

Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth.

Additionally, in one or more embodiments (not shown in the figures), client computer 200 may include an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), client computer 200 may include a hardware microcontroller instead of a CPU. In one or more embodiment, the microcontroller may directly execute its own embedded logic to perform actions and access its own internal memory and its own external Input and Output Interfaces (e.g., hardware pins and/or wireless transceivers) to perform actions, such as System On a Chip (SOC), or the like.

Illustrative Network Computer

Figure 3:
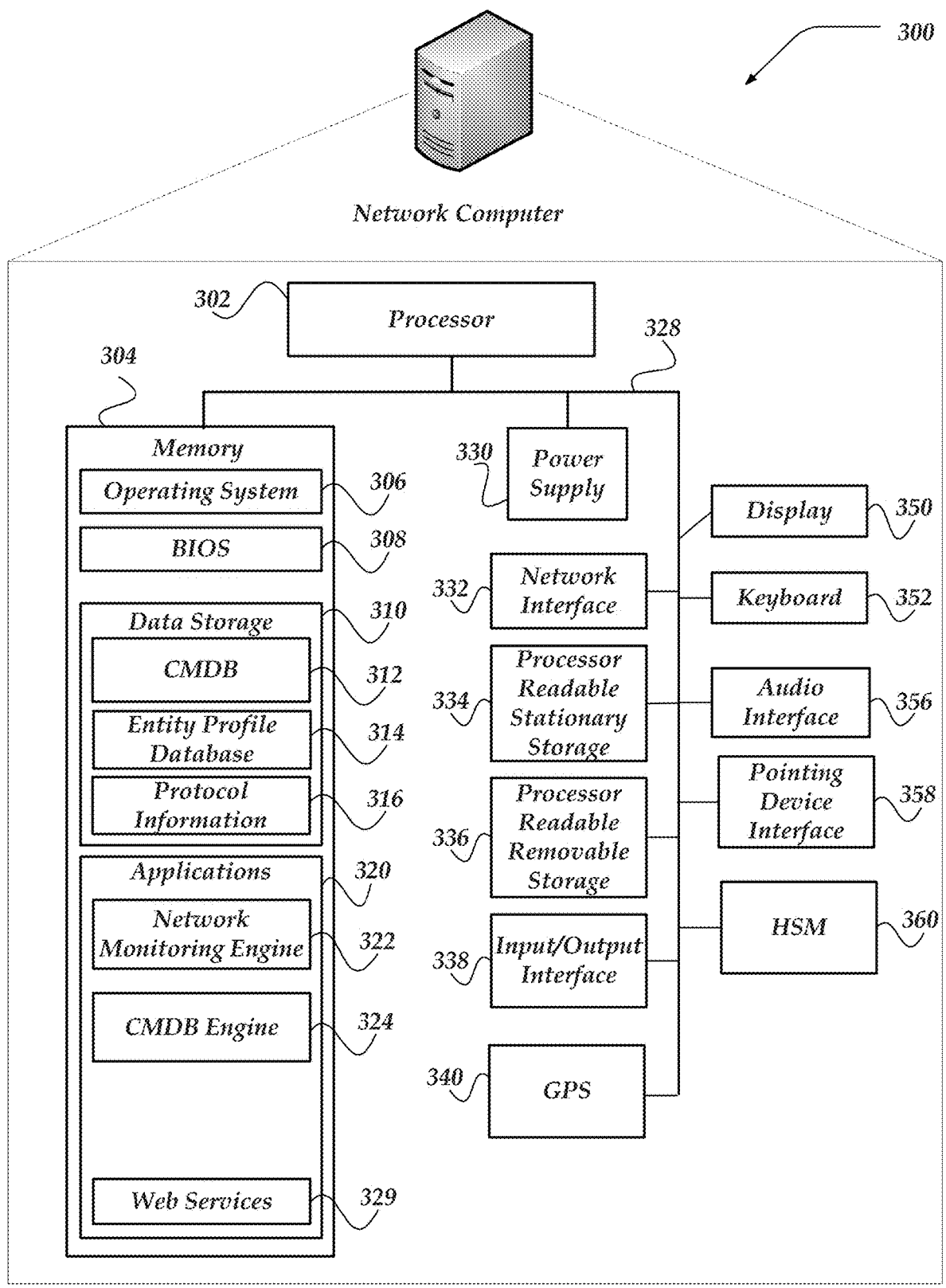
FIG. 3 illustrates a schematic embodiment of a network computer.

FIG. 3 shows one embodiment of network computer 300 that may be included in a system implementing at least one of the various embodiments. Network computer 300 may include many more or less components than those shown in FIG. 3. However, the components shown are sufficient to disclose an illustrative embodiment for practicing these innovations. Network computer 300 may represent, for example, one embodiment of at least one of application server computer 116, configuration management database server computer 117, or network monitoring computer 118 of FIG. 1.

As shown in the figure, network computer 300 includes a processor 302 that may be in communication with a memory 304 via a bus 328. In some embodiments, processor 302 may be comprised of one or more hardware processors, or one or more processor cores. In some cases, one or more of the one or more processors may be specialized processors designed to perform one or more specialized actions, such as, those described herein. Network computer 300 also includes a power supply 330, network interface 332, audio interface 356, display 350, keyboard 352, input/output interface 338, processor-readable stationary storage device 334, and processor-readable removable storage device 336. Power supply 330 provides power to network computer 300.

Network interface 332 includes circuitry for coupling network computer 300 to one or more networks, and is constructed for use with one or more communication protocols and technologies including, but not limited to, protocols and technologies that implement any portion of the Open Systems Interconnection model (OSI model), global system for mobile communication (GSM), code division multiple access (CDMA), time division multiple access (TDMA), user datagram protocol (UDP), transmission control protocol/Internet protocol (TCP/IP), Short Message Service (SMS), Multimedia Messaging Service (MMS), general packet radio service (GPRS), WAP, ultra-wide band (UWB), IEEE 802.16 Worldwide Interoperability for Microwave Access (WiMax), Session Initiation Protocol/Real-time Transport Protocol (SIP/RTP), or any of a variety of other wired and wireless communication protocols. Network interface 332 is sometimes known as a transceiver, transceiving device, or network interface card (NIC). Network computer 300 may optionally communicate with a base station (not shown), or directly with another computer.

Audio interface 356 is arranged to produce and receive audio signals such as the sound of a human voice. For example, audio interface 356 may be coupled to a speaker and microphone (not shown) to enable telecommunication with others and/or generate an audio acknowledgement for some action. A microphone in audio interface 356 can also be used for input to or control of network computer 300, for example, using voice recognition.

Display 350 may be a liquid crystal display (LCD), gas plasma, electronic ink, light emitting diode (LED), Organic LED (OLED) or any other type of light reflective or light transmissive display that can be used with a computer. In some embodiments, display 350 may be a handheld projector or pico projector capable of projecting an image on a wall or other object.

Network computer 300 may also comprise input/output interface 338 for communicating with external devices or computers not shown in FIG. 3. Input/output interface 338 can utilize one or more wired or wireless communication technologies, such as USB™, Firewire™, WiFi, WiMax, Thunderbolt™, Infrared, Bluetooth™, Zigbee™, serial port, parallel port, and the like.

Also, input/output interface 338 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect and/or measure data that is external to network computer 300. Human interface components can be physically separate from network computer 300, allowing for remote input and/or output to network computer 300. For example, information routed as described here through human interface components such as display 350 or keyboard 352 can instead be routed through the network interface 332 to appropriate human interface components located elsewhere on the network. Human interface components include any component that allows the computer to take input from, or send output to, a human user of a computer. Accordingly, pointing devices such as mice, styluses, track balls, or the like, may communicate through pointing device interface 358 to receive user input.

GPS transceiver 340 can determine the physical coordinates of network computer 300 on the surface of the Earth, which typically outputs a location as latitude and longitude values. GPS transceiver 340 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of network computer 300 on the surface of the Earth. It is understood that under different conditions, GPS transceiver 340 can determine a physical location for network computer 300. In one or more embodiment, however, network computer 300 may, through other components, provide other information that may be employed to determine a physical location of the client computer, including for example, a Media Access Control (MAC) address, IP address, and the like.

Memory 304 may include Random Access Memory (RAM), Read-Only Memory (ROM), and/or other types of memory. Memory 304 illustrates an example of computer-readable storage media (devices) for storage of information such as computer-readable instructions, data structures, program modules or other data. Memory 304 stores a basic input/output system (BIOS) 308 for controlling low-level operation of network computer 300. The memory also stores an operating system 306 for controlling the operation of network computer 300. It will be appreciated that this component may include a general-purpose operating system such as a version of UNIX, or LINUX™, or a specialized operating system such as Microsoft Corporation's Windows® operating system, or the Apple Corporation's IOS® operating system. The operating system may include, or interface with a Java virtual machine module that enables control of hardware components and/or operating system operations via Java application programs. Likewise, other runtime environments may be included.

Memory 304 may further include one or more data storage 310, which can be utilized by network computer 300 to store, among other things, applications 320 and/or other data. For example, data storage 310 may also be employed to store information that describes various capabilities of network computer 300. The information may then be provided to another device or computer based on any of a variety of methods, including being sent as part of a header during a communication, sent upon request, or the like. Data storage 310 may also be employed to store social networking information including address books, buddy lists, aliases, user profile information, or the like. Data storage 310 may further include program code, data, algorithms, and the like, for use by a processor, such as processor 302 to execute and perform actions such as those actions described below. In one embodiment, at least some of data storage 310 might also be stored on another component of network computer 300, including, but not limited to, non-transitory media inside processor-readable removable storage device 336, processor-readable stationary storage device 334, or any other computer-readable storage device within network computer 300, or even external to network computer 300. Data storage 310 may include, for example, configuration management database (CMDB) 312, entity profile database 314, protocol information 316, or the like. Configuration management database (CMDB) 312 may be a data store that contains information related to the information technology information and its configuration for an organization. And, protocol information 316 may store various rules and/or configuration information related to one or more network communication protocols, including application protocols, secure communication protocols, client-server protocols, peer-to-peer protocols, shared file system protocols, or the like, that may be employed in a monitored network environment.

Applications 320 may include computer executable instructions which, when executed by network computer 300, transmit, receive, and/or otherwise process messages (e.g., SMS, Multimedia Messaging Service (MMS), Instant Message (IM), email, and/or other messages), audio, video, and enable telecommunication with another user of another mobile computer. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth. Applications 320 may include network monitoring engine 322, CMDB engine 324, web services 329, or the like, that may be arranged to perform actions for embodiments described below. In one or more of the various embodiments, one or more of the applications may be implemented as modules and/or components of another application. Further, in one or more of the various embodiments, applications may be implemented as operating system extensions, modules, plugins, or the like.

Furthermore, in one or more of the various embodiments, network monitoring engine 322, CMDB 324, web services 329, or the like, may be operative in a cloud-based computing environment. In one or more of the various embodiments, these applications, and others, that comprise the management platform may be executing within virtual machines and/or virtual servers that may be managed in a cloud-based based computing environment. In one or more of the various embodiments, in this context the applications may flow from one physical network computer within the cloud-based environment to another depending on performance and scaling considerations automatically managed by the cloud computing environment. Likewise, in one or more of the various embodiments, virtual machines and/or virtual servers dedicated to network monitoring engine 322, CMDB engine 324, web services 329, or the like, may be provisioned and decommissioned automatically.

Also, in one or more of the various embodiments, network monitoring engine 322, CMDB engine 324 web services 329, or the like, or the like, may be located in virtual servers running in a cloud-based computing environment rather than being tied to one or more specific physical network computers.

Further, network computer 300 may also comprise hardware security module (HSM) 360 for providing additional tamper resistant safeguards for generating, storing and/or using security/cryptographic information such as, keys, digital certificates, passwords, passphrases, two-factor authentication information, or the like. In some embodiments, hardware security module may be employ to support one or more standard public key infrastructures (PKI), and may be employed to generate, manage, and/or store keys pairs, or the like. In some embodiments, HSM 360 may be a standalone network computer, in other cases, HSM 360 may be arranged as a hardware card that may be installed in a network computer.

Additionally, in one or more embodiments (not shown in the figures), network computer 300 may include an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), the network computer may include one or more hardware microcontrollers instead of a CPU. In one or more embodiment, the one or more microcontrollers may directly execute their own embedded logic to perform actions and access their own internal memory and their own external Input and Output Interfaces (e.g., hardware pins and/or wireless transceivers) to perform actions, such as System On a Chip (SOC), or the like.

Illustrative Logical System Architecture

Figure 4:
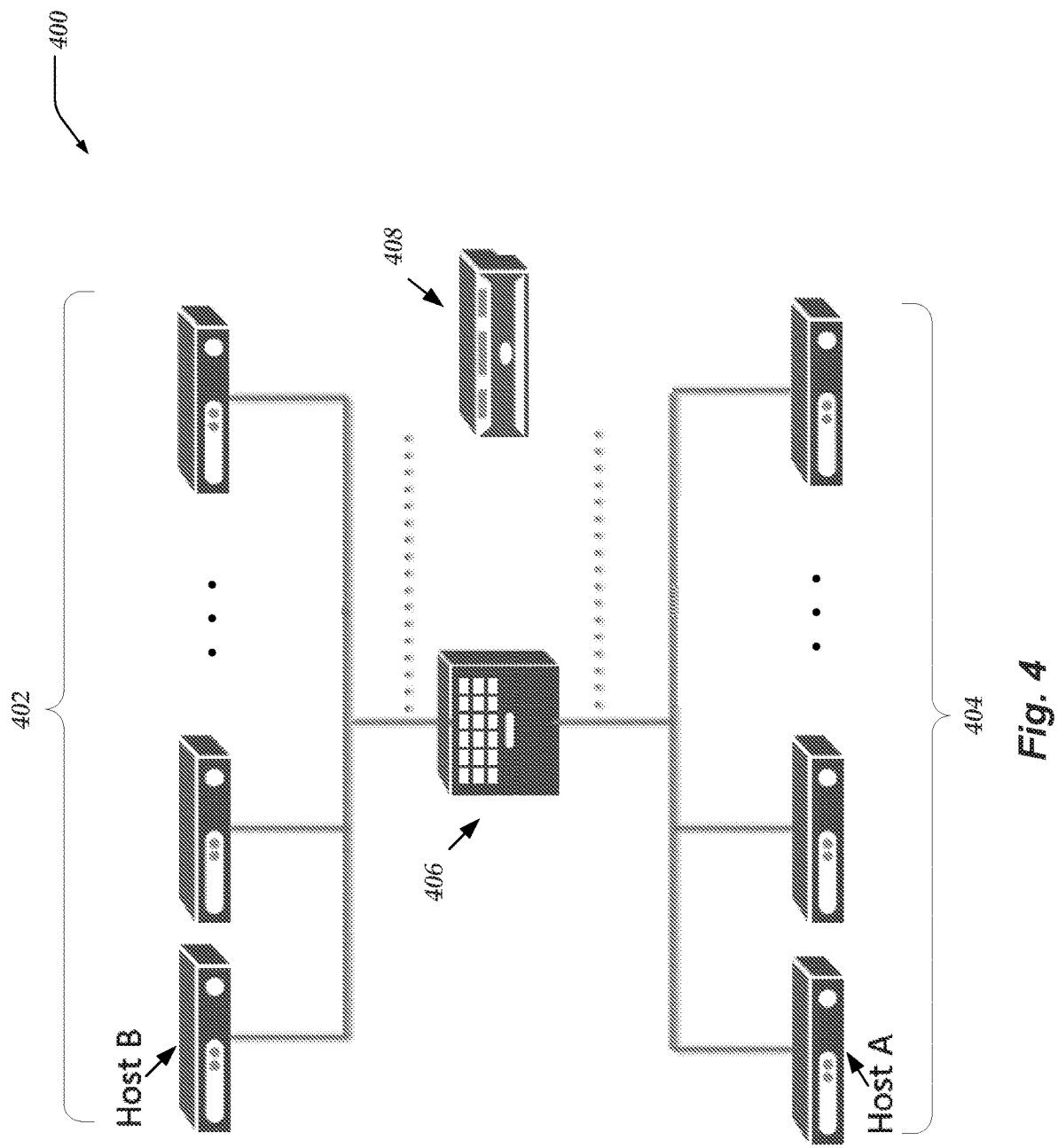
FIG. 4 illustrates a logical architecture of a system for real-time configuration discovery and management in accordance with one or more of the various embodiments.

FIG. 4 illustrates a logical architecture of system 400 for real-time configuration discovery and management in accordance with one or more of the various embodiments. System 400 may be arranged to include a plurality of network devices and/or network computers on first network 402 and a plurality of network devices and/or network computers on second network 404. Communication between the first network and the second network is managed by switch 406. Also, NMC 408 may be arranged to passively monitor or record packets (network packets) that are communicated in network flows between network devices or network computers on first network 402 and second network 404. For example, the communication of flows of packets between the Host B network computer and the Host A network computer are managed by switch 406 and NMC 408 may be passively monitoring and recording some or all of the network traffic comprising these flows.

Also, NMC 408 may be arranged to passively monitor network communication between and among hosts that are on the same network, such as, network computers 402.

NMC 408 may be arranged to receive network communication for monitoring through a variety of means including network taps, wireless receivers, port mirrors or directed tunnels from network switches, clients or servers including the endpoints themselves, virtual machine, cloud computing instances, other network infrastructure devices, or the like, or combination thereof. In at least some of the various embodiments, the NMC may receive a copy of each packet on a particular network segment or virtual local area network (VLAN). Also, for at least some of the various embodiments, NMCs may receive these packet copies through a port mirror on a managed Ethernet switch, e.g., a Switched Port Analyzer (SPAN) port, or a Roving Analysis Port (RAP). Port mirroring enables analysis and debugging of network communications. Port mirroring can be performed for inbound or outbound traffic (or both) on single or multiple interfaces.

In one or more of the various embodiments, some or all network flows, network traffic, network packets, traffic profile information, or the like, observed by NMC 408 may be stored in data store that enables further processing. In some embodiments, a training engine (not shown) may be arranged for training activity models. Accordingly, in some embodiments, training engines may be enabled to employ some or all of the captured network flows, network traffic, network packets, traffic profile information, or the like.

Also, in one or more of the various embodiments, NMCs, such as, NMC 408 may be arranged to provide entity profiles based on real-time monitoring of network flows, network traffic, network packets, or the like, that may be compared to information stored in a CMDB, or the like.

Figure 5:
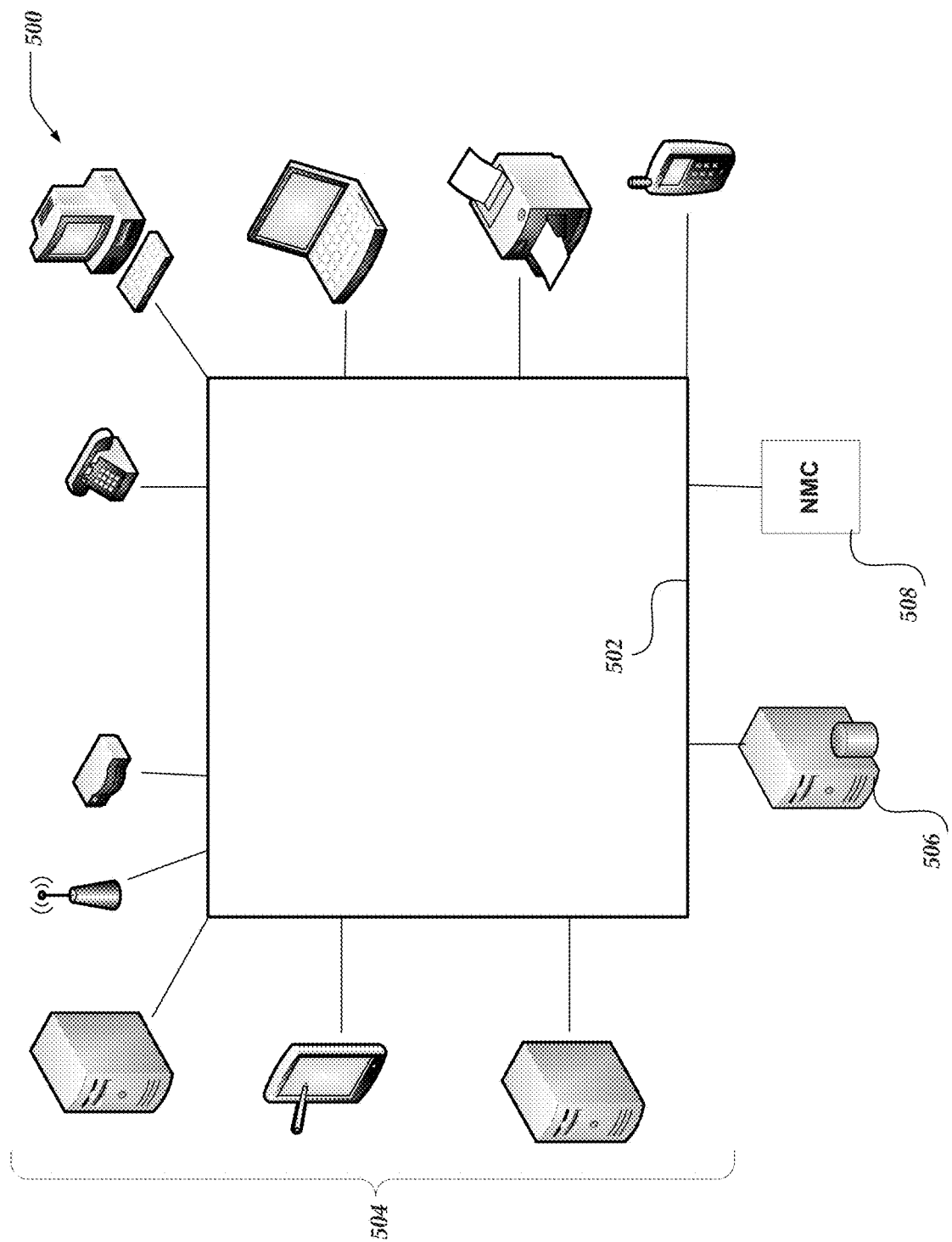
FIG. 5 illustrates a logical architecture of a system for real-time configuration discovery and management in accordance with one or more of the various embodiments.

FIG. 5 illustrates a logical architecture of system 500 for real-time configuration discovery and management in accordance with one or more of the various embodiments. In this example, for some embodiments, system 500 includes network 502, network entities 504, configuration management database (CMDB) 506 and network monitoring computer 508.

In one or more of the various embodiments, network 502 represents one or more networks such as network 108, network 110, or the like. In one or more of the various embodiments, network entities 504, represent the various network computers, network devices, client computers, or the like, that may be using a network, such as, network 502. Further, in one or more of the various embodiments, network entities may include applications (not shown) that may be hosted on one or more network entities.

In one or more of the various embodiments, organizations may be employ CMDBs, such as, CMDB 506 to maintain information that describes their IT infrastructure. In one or more of the various embodiments, CMDB may be databases that include records for various network entities in an organization. Note, in some embodiments, CMDBs may be arranged to include records associated with IT entities or items that are not network entities.

In one or more of the various embodiments, entities included CMDBs are often referred to as configuration items. Accordingly, in one or more of the various embodiments, entities, such as, application servers, document management server, web servers, database servers, routers, switches, desktop computers, laptop computers, printers, telephone sets, wireless access points, or the like, may be included in a CMDB.

In one or more of the various embodiments, the specific fields or values in a given CMDB may be customized based on an organizations need. But generally, entries include information describing the identities, characteristics, features, relationships, install applications, policies, or the like, of entities. Often, in some embodiments, CMDBs may be relied upon to be the definitive record of the entities comprising an organizations IT infrastructure. Accordingly, in some embodiments, organizations require the CMDB to be as accurate as possible. In some cases, CMDBs are used to audit the configuration of an organization's IT infrastructure.

For example, in one or more of the various embodiments, a software license audit may include reviewing CMDB entries to identify the software used in an organization. Likewise, in some embodiments, the CMDB may be used to maintain an inventory or IT devices in an organization.

Also, in one or more of the various embodiments, CMDBs may be populated manually by users performing manual inventory of an organization IT infrastructure. Likewise, in some embodiments, some network entities may be arranged to include or host agents that automatically report configuration information to a CMDB.

In one or more of the various embodiments, by comparing observed network behavior with CI entries in the CMDB, the NMC identify devices or applications that may be operating out of compliance with restrictions defined in the CMDB. Accordingly, in one or more of the various embodiments, the real-time configuration discovery information (e.g., entity profiles) may be used to audit to accuracy of a CMDB. Further, in some embodiments, the NMC may be used to independently audit an organization's IT infrastructure. Accordingly, in one or more of the various embodiments, if discrepancies are discovered, the NMC may be arranged provide one or more discrepancy notices that may be used to populate reports or trigger the performance of one or more mitigation or remediation actions.

Accordingly, in one or more of the various embodiments, NMC may be arranged to determine if an organization is exceeding its internal compliance boundaries. Likewise, the information provided by the NMC may be used to determine if an organization is in compliance with third-party requirements independent of the CMDB, such as, Payment Card Industry's Data Security Standard (PCI DSS), or the like. In some case, real-time configuration discovery may be employed to provide unbiased security audits without directly involving an organization's own IT staff. For example, in some embodiments, because an NMC may be arranged to perform real-time configuration discovery using passive network monitoring, the NMC may generate audit or compliance reports absent significant coordination or cooperation with an organization IT personal.

Further, in some embodiments, NMCs may be arranged to perform real-time configuration discovery in parallel with other configuration management efforts.

In one or more of the various embodiments, because NMCs are monitoring network traffic they may discover network entities that traditional agent based CMDB may be unable to monitor. For example, in one or more of the various embodiments, server-less applications (e.g., microservices) or container based services may be both ephemeral and resistant to installing onboard agents that some CMDBs rely on for information discovery or validation. NMCs may identify server-less applications by observing their network traffic. Likewise, because some containers for container-based services are spun up and then discarded on a per transaction basis traditional CMDBs may be unable to identify or manage such services even though they may be performing critical (or risky) activities for an organization.

Also, in one or more of the various embodiments, NMCs may be arranged to monitor or audit federated user credential services because they may observe the network traffic to or from credential services. Accordingly, in some embodiments, the NMC may be arranged identify users that may be exceeding their access authority.

In one or more of the various embodiments, NMCs may be arranged to identify entities, such as one or more network devices, network applications, or the like, that may be associated with entity profiles based on the network footprints of the devices or applications rather than requiring deep packet inspection. Thus, in some embodiments, entity profiles may be provided without expensive or intrusive deep packet inspection that may require decryption of encrypted network traffic. Network footprints comprising tuple information, source address, destination address, flow rate characteristics, flow direction characteristics, request-response timing, or the like, or combination thereof, may be used to provide entity profiles that may be compared to CI entries in an CMDB.

For example, if a CI entry identifies a video media server, the network traffic may be expected to comprising receiving light-weight/short requests that in sustained/high-volume responses. This is because a video server may be expected to receive many requests from outside clients (e.g., consumers) to stream them video. Thus, if a NMC discovers a "video server" that is making a significant amount of its own requests, the NMC may identify that video server as not performing as expected. Note, in some embodiments, this sort of behavior anomaly may be discovered absent packet inspection which otherwise may require resource intensive deep packet inspection of a high volume of video traffic.

In one or more of the various embodiments, low impact or light-touch analysis may include discovering if devices or applications are accessing or communication within the boundaries of their authorized relationships. For example, an application may be authorized to communication with one or more specified devices, networks, or application. In this example, an NMC performing real-time configuration discovery may easily identify unauthorized access or communication based on the tuple information associated with network traffic to or from devices or applications without performing expensive or intrusive deep packet inspection. In this example, if the NMCs observes a device sending network traffic to destinations outside of its authorized relationships a discrepancy notice may be provided that flags the device and perform various mitigation or remediation actions in response. The particular mitigation or remediation actions may be determined based on rule-based polices, configuration information, or the like.

Figures 6A, 6B:
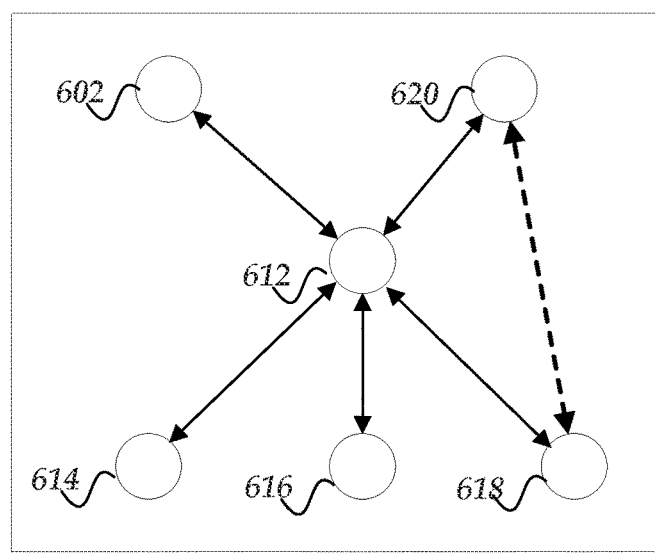
FIG. 6A represent a logical representation of a configuration database in accordance with one or more of the various embodiments.
FIG. 6B represents a logical schematic of relationships between different IT assets that may be represented by CI entries in a CMDB in accordance with one or more of the various embodiments.

FIG. 6A represent a logical representation of configuration database 600 in accordance with one or more of the various embodiments. In one or more of the various embodiments, as discussed above information about an organization's IT infrastructure may be recorded in a configuration management database (CMDB). Also, in one or more of the various embodiments, CMDBs may be arranged to record information about individual IT infrastructure assets using data structures, such as, configuration item (CI) entry 602. In one or more of the various embodiments, CI entries may be arranged to various fields such as CI fields 604 that represent characteristics of the management IT asset. The particular fields may vary depending on the type of asset or the schema being used by the CMDB. CMDB schema may include industry standard schema, customer schema, or combination thereof. In some embodiments, CI entries may include fields such as field 606 which in this example represents software applications that may be running or hosted by the IT asset corresponding to CI entry 602. Further, in some embodiments, CI entries, such as CI entry 602 may be arranged to include a field, such as, field 608 that includes policy information for the IT asset. And, in some embodiments, a CI entry may be arranged to include a field such a field 610 that represent one or more relationships the IT asset has to other IT assets.

In one or more of the various embodiments, one or more fields in a CI entry may reference other CI entries. For example, in some embodiments, field 606 may reference one or more CI entries that each correspond to the application running on the IT asset that is represented by CI entry 602. Accordingly, in one or more of the various embodiments, while not shown here, CI entries may be arranged in hierarchy or tree structure, such that CI entries for IT assets, such as, servers, or the like, may have references to other CI entries that may be related to an individual server. Thus, in this example, if CI entry 602 corresponds to a server, field 606 may be a root of a tree data structure that includes or references one or more CI entries that correspond to one or more applications running on the server. In other embodiments, such fields may reference lists of CI entries representing the one or more CI items.

Also, in some embodiments, CI entries may be arranged to represent one more relationships to other IT assets that may be represented by other CI entries. Accordingly, in some embodiments, a CMDB may be arranged to describe or define the allowed or expected relationships between or among the IT assets that comprise an organization's IT infrastructure. For example, a server that is hosting a web server application may have an expected or allowed relationship to a database server and a authentication server (e.g., LDAP server). Accordingly, in this example, the database server store application information for one or more web services running on the server and the authentication server may be used to authenticate user of the web services.

In one or more of the various embodiments, CI entries may be arranged into a class hierarchy where CI entries are arranged into classes, sub-classes, or the like. In some embodiments, CI entries may be arranged to support some object-oriented properties such as inheritance, composition, or the like.

FIG. 6B represents a logical schematic of relationships between different IT assets that may be represented by CI entries in a CMDB in accordance with one or more of the various embodiments. In this example, for one or more embodiments, field 610 of CI entry 602 may define various relationships to other CI entries representing other IT assets in an organization's IT infrastructure. In this example, CI entry 612, CI entry 614, CI entry 616, CI entry 618, and CI entry 620 represent CI entries of IT assets managed by a CMDB. In this example, the solid lines connecting the CI entries represent relationships between the IT assets corresponding to the CI entries that are recorded in the CMDB. For example, in some embodiments, if CI entry 612 corresponds to a database server that is arranged to provide databases services to IT assets that correspond to CI entry 602, CI entry 614, CI entry 616, CI entry 618, and CI entry 620, those relationships should be included in the CMDB.

In contrast, in this example, the dashed line connecting CI entry 618 and CI 620 represents the existence of a unknown or unauthorized relationship between two IT assets that is not recorded in the CMDB. For example, in some embodiments, if an unauthorized application on running on the IT asset represented by CI entry 618 is communicating with the IT asset represented by CI entry 620, that particular unknown or unauthorized relationship will not be included in the CMDB.

Generalized Operations

Figure 7:
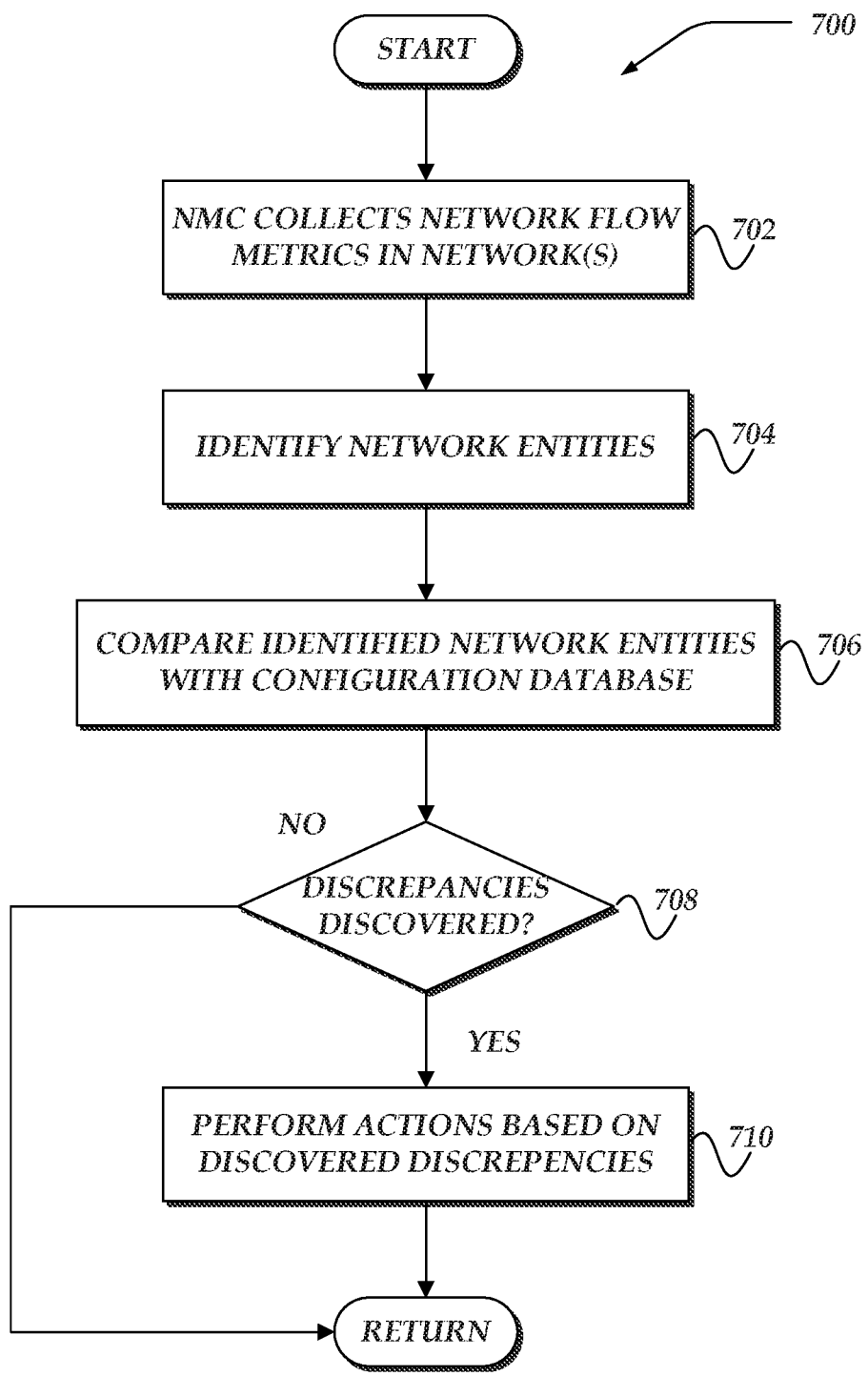
FIG. 7 illustrates an overview flowchart of a process for real-time network configuration discovery and management in accordance with one or more of the various embodiments.
Figure 8:
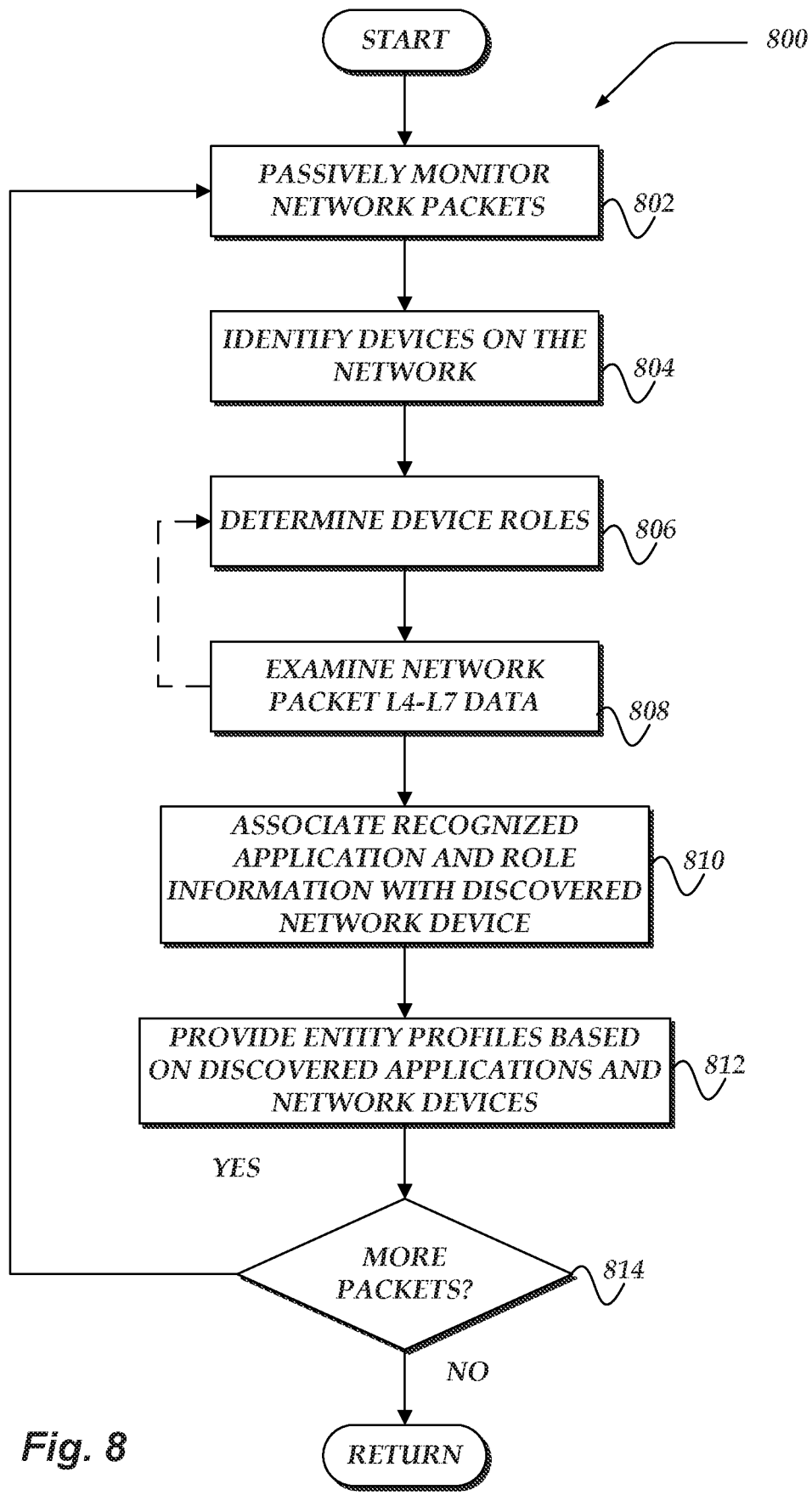
FIG. 8 shows a flowchart for a process for automated discovery of network entities in accordance with at least one of the various embodiments.
Figure 9:
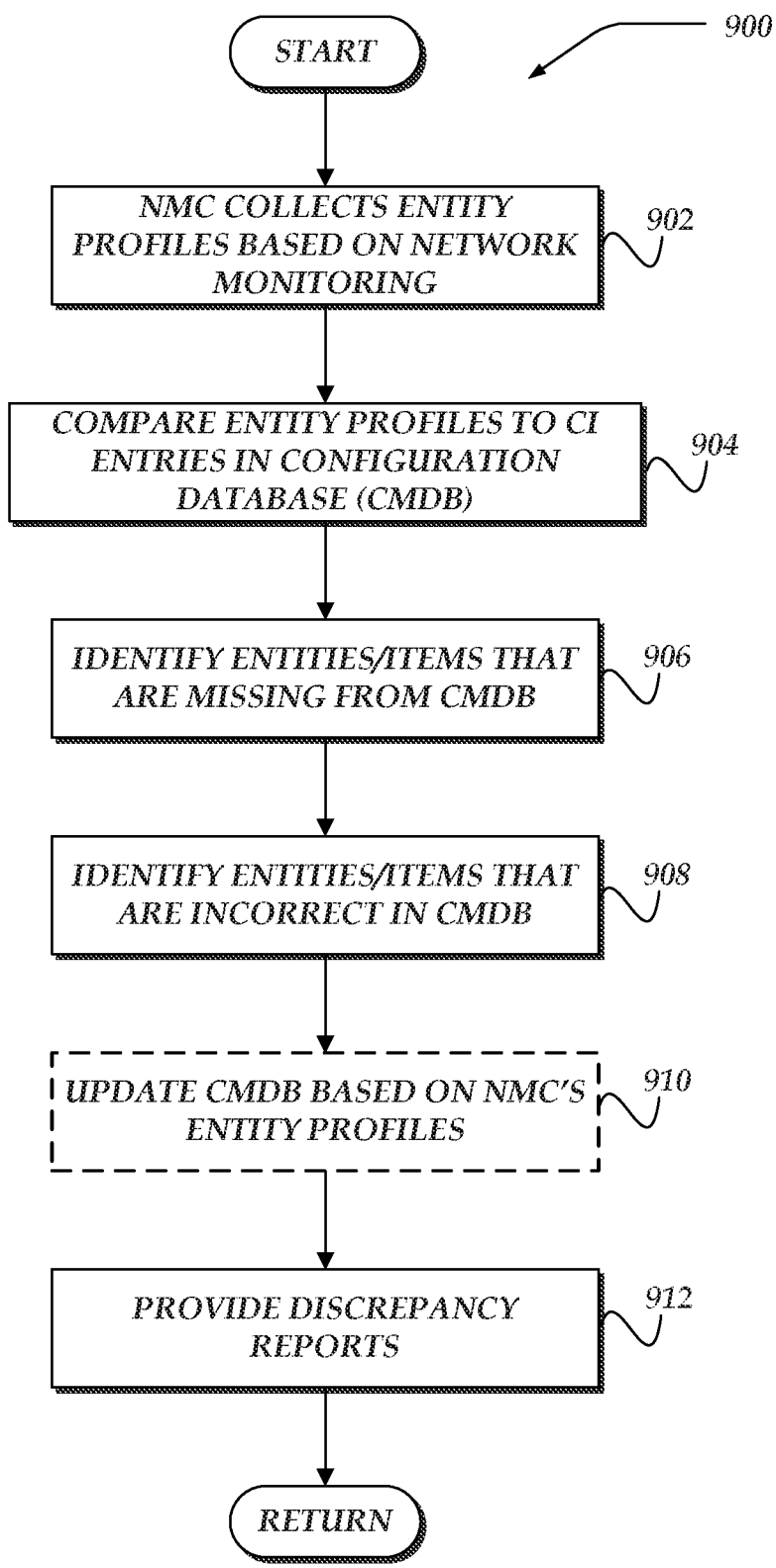
FIG. 9 shows a flowchart for a process for real-time auditing of IT infrastructure configuration in one or more monitored networks in accordance with at least one of the various embodiments.

FIGS. 7-9 represent generalized operations for real-time configuration discovery and management in accordance with one or more of the various embodiments. In one or more of the various embodiments, processes 700, 800, and 900 described in conjunction with FIGS. 7-9 may be implemented by and/or executed by one or more processors on a single network computer (or network monitoring computer), such as network computer 300 of FIG. 3. In other embodiments, these processes, or portions thereof, may be implemented by and/or executed on a plurality of network computers, such as network computer 300 of FIG. 3. In yet other embodiments, these processes, or portions thereof, may be implemented by and/or executed on one or more virtualized computers, such as, those in a cloud-based environment. However, embodiments are not so limited and various combinations of network computers, client computers, or the like may be utilized. Further, in one or more of the various embodiments, the processes described in conjunction with FIGS. 7-9 may be used for real-time configuration discovery and management in accordance with at least one of the various embodiments and/or architectures such as those described in conjunction with FIGS. 4-6. Further, in one or more of the various embodiments, some or all of the actions performed by processes 700, 800, and 900 may be executed in part by network monitoring engine 322, or CMDB engine 324 running on one or more processors of one or more network computers.

FIG. 7 illustrates an overview flowchart of process 700 for real-time network configuration discovery and management in accordance with one or more of the various embodiments. After a start block, at block 702, in one or more of the various embodiments, an NMC may be arranged to collect network flow metrics for network flows in one or more networks. As described above, the NMC may be arranged to employ a network monitoring engine, such as, network monitoring engine 322, to passively monitor some or all of the network traffic that comes across the one or more monitored networks.

At block 704, in one or more of the various embodiments, the NMC may be arranged to identify one or more network entities based on the monitored network traffic associated with the one or more monitored network flows. As described herein, the NMC may be arranged to perform a variety of actions to identify one or more network devices or applications based on the characteristics of the monitored network traffic.

At block 706, in one or more of the various embodiments, the NMC may be arranged to compare the identified network entities with CI entries in a CMDB. As described herein, the NMC may be arranged to provide entity profiles that may be associated with device, applications, or the like, that may be discovered by observing their associated network traffic in the one or more monitored networks.

At decision block 708, in one or more of the various embodiments, if one or more discrepancies are discovered, control may flow to block 710; otherwise, control may be returned to a calling process. As describe herein, discrepancies may include devices, applications, or the like, that are incorrectly identified or omitted in the CMDB.

At block 710, in one or more of the various embodiments, the NMC may be arranged to perform one or more actions based on the discovered discrepancies. In one or more of the various embodiments, NMCs may be arranged to perform remediation actions, mediation actions, reporting/notification actions, or the like, or combination thereof, based on one or more discovered errors or omissions in the CMDB. Next, control may be returned to a calling process.

FIG. 8 shows a flowchart for process 800 for automated discovery of network entities in accordance with at least one of the various embodiments. After a start block, at block 802, in one or more of the various embodiments, an NMC may passively monitor network packets that may be transmitted over one or more monitored networks. In one or more of the various embodiments, the NMC may be enabled to employ various techniques for passively monitoring network packets that may be flowing on the monitored networks, including, SPAN ports, mirror ports, network taps, or the like, provided by various network devices, such as, one or more routers, switches, network devices, network computers, client computers, or the like, including one or more virtualized devices, that may be operative on the monitored networks.

At block 804, in one or more of the various embodiments, network devices that may be on the network may be identified based on network packets the NMC may monitor. In one or more of the various embodiments, the NMC may be enabled to perform various techniques to identify network devices that are operative on the monitored networks.

In one or more of the various embodiments, the NMC may detect devices if they emit any network packets onto the network that may be observed by the NMC. In one or more of the various embodiments, network packet emission may occur during the course of normal network communication between and among one or more devices on the network. In one or more of the various embodiments, the NMC may be a non-participant in the ongoing network communication among and/or between the entities that may emit the capture/monitored network packets. In one or more of the various embodiments, the NMC may passively capture the network packets without interfering and/or participating in the communication.

In one or more of the various embodiments, the NMC may perform active tests and/or probes of the monitored networks. In some embodiments, one or more active tests may be triggered based on the results from passive discovery techniques. For example, in one or more of the various embodiments, an NMC may be arranged and/or configured to confirm the existence of one or more discovered devices by actively contacting them (e.g., pinging the discovered device, or the like). In one or more of the various embodiments, the NMC may determine if and how to actively probe devices based on one or more defined rule based policies or configuration information.

In some embodiments, some network packets may be one or more various forms of "device advertisements" that may be intended to provide a manifest of available services to other systems on the network—generally systems other than the NMC. For example, in some embodiments, such device advertisements may include, Cisco Discovery Protocol (CDP), Simple Service Discovery Protocol (SSDP), Router Advertisement, Gratuitous ARPs, or the like.

In one or more of the various embodiments, the detection of an emitted network packet may be considered proof-positive of the existence of a given device on the network. In contrast, in some embodiments, the receipt of a network packet may not provide verifiable proof of the existence of a device solely by external observation.

In one or more of the various embodiments, network packets may contain framing headers that include a source and destination hardware identifier, such as, a MAC address. In one or more of the various embodiments, the NMC may use the source MAC address to uniquely identify the network packet emitting entity on the network.

In one or more of the various embodiments, an exception to the emission-only rule may be made for certain entities which advertise a MAC address that may not match their physical hardware address. For example, devices such as virtual routers, employing protocols such as, Virtual Router Redundancy Protocol (VRRP), Common Address Redundancy Protocol (CARP), Hot Standby Router Protocol (HSRP), or the like, may be discovered upon observing network traffic seen heading to that destination. In one or more of the various embodiments, the MAC addresses observed by the NMC may be employed by the NMC to disambiguate devices at the datalink layer (e.g., OSI Layer 2).

In some embodiments, it may be desirable to disambiguate devices at the network layer (OSI Layer 3 aka L3). In one or more of the various embodiments, L3 disambiguation cannot simply count L3 network address, such as, IP addresses, because the various tap points on an internet-facing connection may be exposed to billions of network layer addresses. Thus, in one or more of the various embodiments, it may be desirable to identify the one or more subsets of L3 addresses that may be of interest, such as address that one local to monitored networks, or the like. In one or more of the various embodiments, the NMC may be configured using mask, filters, or the like, as part of identifying the one or more subsets of L3 address that may be of interest.

In one or more of the various embodiments, the NMC may be arranged to employ one or more L2-to-L3 (OSI Layers) mapping processes for identifying L3 addresses of interest. Since L2 protocols may be present on the local L2 broadcast domain, or subnets, the NMC may identify network packets that may include header information that may be used for mapping the L2 address with a L3 address. In one or more of the various embodiments, if the L3 address may be mapped to a L2 address, the NMC may determine that it is monitoring network packets from a local L3 address. For example, Address Resolution Protocol (ARP) is a protocol that specifies L2-to-L3 address mapping. Thus, in some embodiments, if an ARP packet may be observed by the NMC on a local network, the NMC may examine the ARP network packet to determine a mapping of L3 addresses to the underlying L2 device. Given that ARP network packets cannot be routed across broadcast domains (e.g., beyond a sub-net), a non-proxied ARP request observed on a local network for an L3 address may indicate that the L3 address may be considered local by the requestor. Thus, the NMC may rely on this property of the ARP protocol to establish the L2-to-L3 mapping. Other protocols may also be exploited to determine L2-to-L3 address mapping information, for example, IPv6 provides the Neighbor Discovery Protocol (NDP). Accordingly, in one or more of the various embodiments, the NMC may examine captured NDP network packets to determine L2-to-L3 address mappings, as well.

In one or more of the various embodiments, network device address mapping may be stored using, data storage 310, a database, or the like. In one or more of the various embodiments, the device-address mapping data, as well as, the device discovery data may be stored using data storage techniques that enable the NMC to access the data using various searches and queries for use in application discovery, application dependency discovery, operating system discovery, CMDB auditing, or the like, or combination thereof.

At block 806, in one or more of the various embodiments, one or more roles for the discovered devices may be determined based on the monitored network packets. In one or more of the various embodiments, in addition to employing the observed network packets to identify devices on the monitored networks, the NMC may analyze the network packets to determine one or more roles that the discovered devices may perform.

In one or more of the various embodiments, roles determined by the NMC may include, web server, database, router, switch, directory server, network attached storage (NAS), printer, or the like, or combination thereof. In one or more of the various embodiments, the NMC may be arranged to perform various passive analysis techniques for determining the roles that may be associated with a discovered device.

In one or more of the various embodiments, the NMC may identify the hardware device vendor for a discovered device based on the top-24 bits of the discovered device's MAC address. In one or more of the various embodiments, this portion of the MAC address is the Organizationally Unique Identifier (OUI) for the discovered device. OUI is an industry standard that may be relied upon to identify the vendor information for a discovered device. In one or more of the various embodiments, the NMC may be arranged to employ the OUI to lookup the vendor of the discovered device. in one or more of the various embodiments, the vendor information may be used by the NMC as part of determining the role of the discovered device. In one or more of the various embodiments, the NMC may use one or more well-known techniques to query a local or remote service/process that may provide the vendor information that corresponds to an OUI.

In one or more of the various embodiments, the NMC may examine captured network packets for dedicated discovery protocols, such as Cisco Discovery Protocol (CDP), Link Layer Discovery Protocol (LLDP), or the like, to determine additional details about the discovered devices.

Thus, in one or more of the various embodiments, the NMC may include processes and/or modules that may be arranged to recognize and examine the contents of one or more well-known discovery protocols. Each discovery protocol may have well-known and/or determinable formats and content values that may be exploited by the NMC to facilitate the identification of one or more roles for discovered devices.

In one or more of the various embodiments, network packets associated with discovered devices may be examined and one or more heuristics may be used to determine if discovered device may be routing network traffic or if it may be originating network traffic. In one or more of the various embodiments, the NMC may determine if discovered devices may be routing network traffic rather than originating it based in part on various attributes of network packets associated with such devices, such as, the number of IP addresses, varying hop counts, IP ID distributions, or so forth.

In one or more of the various embodiments, the NMC may determine that some monitored network packets may include information for network management services/protocols, such as Dynamic Host Configuration Protocol (DHCP), Domain Name Service (DNS), NETBIOS, or the like. In one or more of the various embodiments, the NMC may be configured to recognize these and other well-known protocols. Information available in these common protocols may also be used for determining the one or more roles for a discovered device. Also, in one or more of the various embodiments, the fact that a device is emitting these types of network packets may contribute the role determination. For example, in one or more of the various embodiments, a discovered device that is emitting DHCP discovery requests may be identified with a role such as "DHCP client." Similarly, in one or more of the various embodiments, a discovered device that is observed emitting a DHCP offer message may be identified with a role, such as, DHCP server.

In one or more of the various embodiments, the NMC may passively monitor the network packets used by active discovery protocols to glean information that may be used for identifying the roles of the discovered devices. In other words, the NMC may passively piggy back on other active discovery protocols and network management protocols that may be operative on the monitored networks to further identify devices and the one or more roles of the discovered devices. In one or more of the various embodiments, the NMC may be arranged to examine and recognize more or fewer protocols that are discussed herein without departing from the spirit and scope of the innovation disclosed herein. One of ordinary skill in the art will appreciate that additional rules, configuration information that include various conditions, protocol state machines, heuristics, or the like, may be provided to identify various roles performed by one or more discovered devices in the one or more monitored networks.

In one or more of the various embodiments, the NMC may perform active tests or probes of the monitored networks to discover roles that may be associated with discovered devices. In some embodiments, one or more active tests may be triggered based on the results from passive discovery techniques. In one or more of the various embodiments, an NMC may be arranged or configured to confirm the existence of one or more discovered application by actively contacting them. For example, the NMC could determine if a particular device is associated with a database server role by opening a connection to one or more ports that one or more database servers are known to listen on. If a database server listening on one of the ports responds, it may confirm its presence. In one or more of the various embodiments, the NMC may determine if or how to actively probe devices based on one or more defined rule based policies, configuration information, or the like.

In one or more of the various embodiments, one or more role discovery techniques may be used together to determine the one or roles associated with a discovered device. In one or more of the various embodiments, a confidence score may be generated based on the amount of evidence collected that indicates a particular role for device. For example, in one or more of the various embodiments, explicit roles that may be determined based on observing discovery protocol announcements (CDP, LLDP) may be have a high confidence score. While, in one or more of the various embodiments, roles indicated by less determinative tests or heuristics may result in a lower confidence score.

At block 808, in one or more of the various embodiments, network packets that include OSI Layer 4 through Layer 7 data may be examined by the NMC. In one or more of the various embodiments, the NMC may examine data included in Layer 4 and above in the observed network packets to gain further information about the discovered devices. In one or more of the various embodiments, such information may include, details regarding the applications operative on the discovered device, operating system information, application dependencies, or the like, or combination thereof.

In one or more of the various embodiments, the NMC may optionally loop back to block 806 to employ information gathered at this step (block 808) for use in additional role discovery for the discovered devices.

At block 810, in one or more of the various embodiments, the discovered application information and the device role information may be associated with the corresponding discovered devices. In one or more of the various embodiments, while applications and devices may be managed or monitored independently it may be advantageous to associate discovered applications with the devices they may be running or communicating with. In one or more of the various embodiments, this enables evaluation of if the applications associated with given devices are appropriate. Likewise, in some embodiments, such associations may be useful for evaluating if a given device is appropriate for a given application.

At block 812, in one or more of the various embodiments, by employing passive discovery techniques the NMC may determine one or more (often many) properties about the discovered devices or applications that may be included in an entity profile. In one or more of the various embodiments, these properties may be associated with the discovered device or applications using one or more well-known data structures to generate an entity profile, property sheet, or the like. In one or more of the various embodiments, the entity profile may be stored in, a database, data storage 310, or the like. In one or more of the various embodiments, entity profiles may be indexed using various keys such as device name, IP address, MAC address, vendor, role, applications, or the like, or combination thereof, to enable retrieval of entity profiles as needed. Further, in one or more of the various embodiments, even though the collection of device/application/role characteristics may be described as an profile data structure that may explicitly be associated with device or application, it may also be implied based one or more relationships between the device and the determined properties.

In one or more of the various embodiments, as additional information about a device or application may be discovered it may be included or associated with the entity profile corresponding to the discovered device or application. In some embodiments, similar to configuration item (CI) entries, entity profiles may be arranged in data structure that reflects the relationship between the various network entities, network devices, applications, or the like.

In one or more of the various embodiments, entity profiles may be arranged include additional metrics discovered by the NMC, such as, number of connections, traffic rate, traffic direction information, duration of connections, security credentials, secure cipher suites used, type of protocols, errors, or the like. In some embodiments, the metrics may include aggregate metrics as well as journal metrics that record or log some or all occurrences of particular observed events or behaviors.

In one or more of the various embodiments, entity profiles may be arranged to include information that corresponds to or is similar to the fields included in one or more CI entries for a CMDB that may be used for managing IT assets in an organization's IT infrastructure. In some embodiments, the NMC may be arranged to provide entity profiles that closely match the CMDB schema being used by the CMDB used for managing the IT assets of an organization's IT infrastructure. Also, in other embodiments, the NMC may employ a CMDB engine, such as, CMDB engine 324, or the like, to map entity profiles to one or more CMDB schemas. For example, in some embodiments, a CMDB engine may be arranged to map various entity profiles to particular CI entries or entity profile fields or properties to one or more CI entry fields.

At decision block 814, in one or more of the various embodiments, if there are more network packets to monitor, control may loop back to block 802. Otherwise, in one or more of the various embodiments, control may be returned to a calling process. In one or more of the various embodiments, the NMC may be enabled to continuously monitor some or all network packets on the monitored networks based on one or more rule-based policies, configuration information, or the like.

In one or more of the various embodiments, the entity profiles as well as other information collected by the NMC may be updated dynamically in real-time based on the observed network packets. Accordingly, in one or more of the various embodiments, the roles associated with a discovered devices may automatically change over the course of being monitored. For example, the NMC may initially determine that a discovered device has a database role, but later observes HTTP packets originating from the discovered device causing the NMC to additionally associate the role "web server" to the device's profile and its entity profile. In such cases, if the device ceases to participate in database transactions, the database role may be removed from its profile for the duration during which it did not participate in these database sessions.

FIG. 9 shows a flowchart for process 900 for real-time auditing of configuration in one or more monitored networks in accordance with at least one of the various embodiments. After a start block, at block 902, in one or more of the various embodiments, an NMC may be arranged to collect one or more entity profiles based on monitoring one or more networks. As described above, a NMC may be arranged to provide entity profiles for device or applications discovered during the monitoring of the one or more networks.

At block 904, in one or more of the various embodiments, a CMDB engine may be arranged to compare one or more entity profiles to configuration item (CI) entries in a CMDB used to managed IT assets of an organization's IT infrastructure. In one or more of the various embodiments, a NMC may be arranged to employ a CMDB engine, such as, CMDB engine 324 to compare entity profiles discovered by the NMC with CI entries in a CMDB. In one or more of the various embodiments, the CMDB engine may be arranged to compare properties, roles, metrics, or the like, in entity profiles with CI entries. For example, as described above, entity profiles may include device information, applications, relationship information, or the like, based on the actual observed network traffic.

Accordingly, in one or more of the various embodiments, the CMDB engine may employ the entity profiles provided by the NMC to confirm that CI entries in the CMDB are accurate. In one or more of the various embodiments, because CMDB may be populated manually or by self-reporting agents running on network devices, some CI entries may not accurately reflect the IT assets that are present in a network. For example, in some embodiments, CI entries in a CMDB may indicate that a server is a database server. However, in one or more of the various embodiments, its associated entity profile may indicate that an unauthorized or unknown torrent server is also running on the same device as the database service. Likewise, for example, in some embodiments, the CMDB may indicate that a device has one network interface with a particular MAC address whereas the entity profile indicate that the network interface used by the device has different MAC address.

Also, in some embodiments, some network devices or applications may be absent from CMDB. For example, in one or more of the various embodiments, an NMC may provide entity profiles that may be for devices or applications that are not included in the CMDB.

At block 906, in one or more of the various embodiments, the NMC may be arranged to employ a CMDB engine to identify one or more CI entries that may be missing from the CMDB. In some embodiments, because the entity profiles are generated based on network activity that actually occurred on the one or more monitored networks, there may be entity profiles that correspond to devices or applications that are unknown to the CMDB.

While in some cases, CMDBs may be arranged to employ various techniques to collect information for CI entries there may be one or more devices or applications are not included in the CMDB. In one or more of the various embodiments, there are many reasons for such omissions, some innocent and or other malicious. In one or more of the various embodiments, one or more authorized devices may be added to the network without updating the CMDB. Likewise, in some embodiments, one or more unauthorized devices or applications may be added to network without updating the CMDB.

Further, in one or more of the various embodiments, modern IT infrastructures may include various assets that may have dynamic or ephemeral manifestations, such as, virtual machines, cloud compute instances, employee personal devices (e.g., BYOD), services that launch other services, IoT devices, or the like. Accordingly, in one or more of the various embodiments, traditional CMDB updating or maintenance techniques may fail to capture such dynamic or ephemeral entities. In some embodiments, CMDBs represent a static view of an IT infrastructure, a snapshot taken at a point in time. Thus, in some embodiments, some entities may be dynamically provisioned and decommissioned in between CMDB snapshots. However, in one or more of the various embodiments, if network traffic occurs on an organization network the NMC will be able to see it and generate a corresponding entity profile. Accordingly, in one or more of the various embodiments, entity profiles not represented in the CMDB may be easily identified.

At block 908, in one or more of the various embodiments, the NMC may identify one or more entities or CI entries that include incorrect or incomplete information the CMDB. In one or more of the various embodiments, the NMC may be arranged to employ a CMDB engine, such as, CMDB engine 324 to identify incorrect CI entries based on the entity profiles provided by the NMC.

In one or more of the various embodiments, CI entries may include details, such as, installed applications, application versions, operating systems, operating system version information, MAC addresses, network addresses, number of network interfaces, relationship rules, network policy, security/cryptographic credentials, or the like, or combination thereof.

In one or more of the various embodiments, the CMDB engine may employ the provided entity profiles to determine if existing CI entries accurately represent the devices or applications in a network.

Also, in one or more of the various embodiments, the CMDB engine employ the provided entity profiles to identify incorrect or unauthorized relationships between devices or application in the monitored networks. For example, one or more relationship rules may define which devices may access each other. Also, in one or more of the various embodiments, relationship definition may be related to device roles. For example, in some embodiments, one or more server devices may be authorized to respond to requests from clients but not to originate or generate requests. Accordingly, in this example, such servers that are monitored as making requests (e.g., performing as client) may be identified exceeding relationship restrictions.

In one or more of the various embodiments, the NMC may be able to discover information that may be absent from CI entries. Thus, in such cases, the CI entries may not technicality be incorrect. However, the CBMD engine may be arranged to identify one or more of these cases and suggest that some or all of the absent information be added the CMDB.

At block 910, in one or more of the various embodiments, optionally, the NMC may update the CMDB based on the entity profiles. In one or more of the various embodiments, the NMC may be arranged to employ a CMDB engine, such as, CMDB engine 324 to update the CMDB to reflect some or all the entity profiles provided by the NMC. In one or more of the various embodiments, the CMDB engine may be arranged to automatically update or correct the CMDB for some discrepancies and not others. For example, in one or more of the various embodiments, the CMDB engine may be arranged to update the CMDB to reflect the installation of authorized applications or devices. In contrast, in some embodiments, entity profiles associated with unauthorized devices, applications, or activity may be absent from the CMDB. For example, in some embodiments, if NMCs provide entity profiles associated with unauthorized activity, CMDB engines may be arranged to generate alerts or notifications rather than updates to the CMDB. In one or more of the various embodiments, CMDB may employ rule-based polices, configuration information, or the like, to determine if the CMDB or CI entries should be automatically updated or otherwise modified. In one or more of the various embodiments, updates to the CMDB may include the time of the change. This can help enable an organization to perform operations, such as, post event security investigations, asset resource planning, time-based cost analysis, or the like.

In one or more of the various embodiments, this block is indicated as being optional because CMDB engine are not always arranged to automatically update CMDBs.

At block 912, in one or more of the various embodiments, the NMC may provide one or more reports describing some or all of the discrepancies that may have been identified. In one or more of the various embodiments, the NMC may be arranged to employ a CMDB engine, such as, CMDB engine 324 to generate or provided one or more reports, notifications, alarms, events, log entries, or the like, or combination thereof, based on some or all of the discrepancies or errors in the CMDB.

In one or more of the various embodiments, a CMDB may be incapable of representing ephemeral IT assets. If so, the entity profiles associated with ephemeral IT assets may be employed to provide an improved understanding of the monitored networks in addition to the CMDB. Next, control may be returned to a calling process.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer-implemented process such that the instructions, which execute on the processor to provide steps for implementing the actions specified in the flowchart block or blocks. The computer program instructions may also cause at least some of the operational steps shown in the blocks of the flowchart to be performed in parallel. Moreover, some of the steps may also be performed across more than one processor, such as might arise in a multi-processor computer system. In addition, one or more blocks or combinations of blocks in the flowchart illustration may also be performed concurrently with other blocks or combinations of blocks, or even in a different sequence than illustrated without departing from the scope or spirit of the invention.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware based systems, which perform the specified actions or steps, or combinations of special purpose hardware and computer instructions. The foregoing example should not be construed as limiting and/or exhaustive, but rather, an illustrative use case to show an implementation of at least one of the various embodiments of the invention.

Further, in one or more embodiments (not shown in the figures), the logic in the illustrative flowcharts may be executed using an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. In one or more embodiment, a microcontroller may be arranged to directly execute its own embedded logic to perform actions and access its own internal memory and its own external Input and Output Interfaces (e.g., hardware pins and/or wireless transceivers) to perform actions, such as System On a Chip (SOC), or the like.

What is claimed as new and desired to be protected by Letters Patent of the United States is:

1. A method for monitoring network traffic in a network, wherein one or more processors in a network computer execute instructions to perform actions, comprising:
    passively monitoring the network to provide a plurality of characteristics associated with one or more network flows, wherein the passive monitoring avoids decryption of encrypted packets in the one or more network flows;
    employing one or more of the plurality of characteristics to determine one or more unknown entities on the network, wherein one or more profiles are determined for the one or more determined entities based on the one or more characteristics;
    comparing the one or more profiles to configuration information associated with one or more previously determined other entities, wherein the comparison is employed to determine one or more differences between the one or more profiles and the configuration information; and
    providing notification of the one or more determined entities and the differences between the one or more profiles for the one or more determined entities and the configuration information for the previously determined other entities.

2. The method of claim 1, wherein the comparing further comprises:
    determining the one or more differences based on employing the one or more profiles to identify one or more errors or omissions in a database for the configuration information.

3. The method of claim 1, further comprising:
    remediating the one or more determined differences by correcting one or more errors or omissions identified in a database for the configuration information based on the one or more profiles.

4. The method of claim 1, further comprising:
    in response to the one or more determined differences, performing one or more audits including a software license audit, a device license audit, an inventory audit, a security audit, or an entity relationship audit; and
    employing the one or more audits to identify each determined difference that violates one or more policies.

5. The method of claim 1, further comprising:
    providing one or more device profiles that correspond to one or more network devices that are determined based on the passive monitoring of the network;
    providing one or more application profiles that correspond to one or more applications that are determined based on the passive monitoring of the network; and
    providing the one or more profiles based on an association of the one or more device profiles with the one or more application profiles.

6. The method of claim 1, wherein the comparing further comprises:
    employing one or more items in a database to determine configuration information that is unassociated with the one or more profiles.

7. The method of claim 1, wherein determining the one or more entities, further comprises:
    employing one or more metrics for the one or more network flows to determine the one or more entities, wherein the one or more metrics include number of connections, traffic rate, traffic direction information, duration of connections, security credentials, secure cipher suites used, types of protocols, or errors.

8. A network monitoring computer (NMC) on a network, comprising:
a memory that stores at least instructions; and
one or more processors that execute instructions that perform actions, including:
passively monitoring the network to provide a plurality of characteristics associated with one or more network flows, wherein the passive monitoring avoids decryption of encrypted packets in the one or more network flows;
employing one or more of the plurality of characteristics to determine one or more unknown entities on the network, wherein one or more profiles are determined for the one or more determined entities based on the one or more characteristics;
comparing the one or more profiles to configuration information associated with one or more previously determined other entities, wherein the comparison is employed to determine one or more differences between the one or more profiles and the configuration information; and
providing notification of the one or more determined entities and the differences between the one or more profiles for the one or more determined entities and the configuration information for the previously determined other entities.

9. The NMC of claim 8, wherein the comparing further comprises:
determining the one or more differences based on employing the one or more profiles to identify one or more errors or omissions in a database for the configuration information.

10. The NMC of claim 8, further comprising:
remediating the one or more determined differences by correcting one or more errors or omissions identified in a database for the configuration information based on the one or more profiles.

11. The NMC of claim 8, further comprising:
in response to the one or more determined differences, performing one or more audits including a software license audit, a device license audit, an inventory audit, a security audit, or an entity relationship audit; and
employing the one or more audits to identify each determined difference that violates one or more policies.

12. The NMC of claim 8, further comprising:
providing one or more device profiles that correspond to one or more network devices that are determined based on the passive monitoring of the network;
providing one or more application profiles that correspond to one or more applications that are determined based on the passive monitoring of the network; and
providing the one or more profiles based on an association of the one or more device profiles with the one or more application profiles.

13. The NMC of claim 8, wherein the comparing further comprises:
employing one or more items in a database to determine configuration information that is unassociated with the one or more profiles.

14. The NMC of claim 8, wherein determining the one or more entities, further comprises:
employing one or more metrics for the one or more network flows to determine the one or more entities, wherein the one or more metrics include number of connections, traffic rate, traffic direction information, duration of connections, security credentials, secure cipher suites used, types of protocols, or errors.

15. A processor readable non-transitory storage media that includes instructions for monitoring network traffic over a network between one or more computers, wherein execution of the instructions by one or more processors on one or more network monitoring computers (NMCs) performs actions, comprising:
passively monitoring the network to provide a plurality of characteristics associated with one or more network flows, wherein the passive monitoring avoids decryption of encrypted packets in the one or more network flows;
employing one or more of the plurality of characteristics to determine one or more unknown entities on the network, wherein one or more profiles are determined for the one or more determined entities based on the one or more characteristics;
comparing the one or more profiles to configuration information associated with one or more previously determined other entities, wherein the comparison is employed to determine one or more differences between the one or more profiles and the configuration information; and
providing notification of the one or more determined entities and the differences between the one or more profiles for the one or more determined entities and the configuration information for the previously determined other entities.

16. The media of claim 15, wherein the comparing further comprises:
determining the one or more differences based on employing the one or more profiles to identify one or more errors or omissions in a database for the configuration information.

17. The media of claim 15, further comprising:
remediating the one or more determined differences by correcting one or more errors or omissions identified in a database for the configuration information based on the one or more profiles.

18. The media of claim 15, further comprising:
in response to the one or more determined differences, performing one or more audits including a software license audit, a device license audit, an inventory audit, a security audit, or an entity relationship audit; and
employing the one or more audits to identify each determined difference that violates one or more policies.

19. The media of claim 15, further comprising:
providing one or more device profiles that correspond to one or more network devices that are determined based on the passive monitoring of the network;
providing one or more application profiles that correspond to one or more applications that are determined based on the passive monitoring of the network; and
providing the one or more profiles based on an association of the one or more device profiles with the one or more application profiles.

20. The media of claim 15, wherein determining the one or more entities, further comprises:
employing one or more metrics for the one or more network flows to determine the one or more entities, wherein the one or more metrics include number of connections, traffic rate, traffic direction information, duration of connections, security credentials, secure cipher suites used, types of protocols, or errors.

* * * * *